United States Patent
Loheide et al.

(10) Patent No.: US 11,638,063 B2
(45) Date of Patent: *Apr. 25, 2023

(54) CREATION OF CHANNELS USING PRE-ENCODED MEDIA ASSETS

(71) Applicant: Turner Broadcasting System, Inc., Atlanta, GA (US)

(72) Inventors: Donald Jude Loheide, Mableton, GA (US); Carlos Jorge M Monteiro, Smyrna, GA (US); Mark Cooper Pope, V, Atlanta, GA (US); James J Arnzen, Atlanta, GA (US); Nicolas Paul Webb, McDonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,281

(22) Filed: May 20, 2021

(65) Prior Publication Data

US 2021/0281914 A1    Sep. 9, 2021

Related U.S. Application Data

(63) Continuation of application No. 15/396,475, filed on Dec. 31, 2016, now Pat. No. 11,134,309.

(51) Int. Cl.
*H04N 21/442* (2011.01)
*H04N 21/2187* (2011.01)
*H04N 21/2668* (2011.01)

(52) U.S. Cl.
CPC ... *H04N 21/44226* (2020.08); *H04N 21/2187* (2013.01); *H04N 21/2668* (2013.01)

(58) Field of Classification Search
CPC ............ H04N 21/458; H04N 21/262; H04N 21/44222; H04N 21/44226; H04N 21/2187; H04N 21/2668
See application file for complete search history.

(56) References Cited

U.S. PATENT DOCUMENTS

| | | |
|---|---|---|
| 3,751,581 A | 8/1973 | Sakata et al. |
| 4,500,930 A | 2/1985 | Hamalainen et al. |

(Continued)

FOREIGN PATENT DOCUMENTS

KR    101061952 B1    9/2011

OTHER PUBLICATIONS

Corrected Notice of Allowance for U.S. Appl. No. 15/396,468 dated Apr. 1, 2022.

(Continued)

*Primary Examiner* — Chenea Davis
(74) *Attorney, Agent, or Firm* — Chip Law Group

(57) ABSTRACT

A system is provided for selecting a pre-encoded media asset of a specified quality level and a specified content encryption mode based on manipulation of a first programming schedule. The pre-encoded media asset is inserted in a media feed of a first channel based on an input on a notification associated with a media item and a defined selection parameter. Based on the insertion of the pre-encoded media asset in different channels and the defined selection parameter, new channels are created. The new channels are created based on a re-use of the pre-encoded media asset for one of the new channels such that the new channels are created independent of an encoding operation prior to a distribution to consumer devices such that the new channels are delivered over a distribution network without being required to be re-encoded.

20 Claims, 5 Drawing Sheets

(56) References Cited

U.S. PATENT DOCUMENTS

| | | |
|---|---|---|
| 5,294,981 A | 3/1994 | Yazolino et al. |
| 6,229,524 B1 | 5/2001 | Chernock et al. |
| 6,378,129 B1 | 4/2002 | Zetts |
| 6,434,621 B1 | 8/2002 | Pezzillo et al. |
| 6,625,811 B1 | 9/2003 | Kaneko |
| 6,701,355 B1 | 3/2004 | Brandt et al. |
| 6,727,914 B1 | 4/2004 | Gulla |
| 7,051,352 B1 | 5/2006 | Schaffer |
| 7,337,458 B2 | 2/2008 | Michelitsch et al. |
| 7,380,262 B2 | 5/2008 | Wang et al. |
| 7,581,237 B1 | 8/2009 | Kurapati |
| 7,840,980 B2 | 11/2010 | Gulla |
| 7,985,134 B2 | 7/2011 | Ellis |
| 8,005,826 B1 | 8/2011 | Sahami et al. |
| 8,099,757 B2 | 1/2012 | Riedl et al. |
| 8,132,203 B2 | 3/2012 | Heer |
| 8,458,053 B1 | 6/2013 | Buron et al. |
| 8,533,761 B1 | 9/2013 | Sahami et al. |
| 8,553,853 B2 | 10/2013 | Middleswarth et al. |
| 8,572,649 B1 | 10/2013 | Gossweiler et al. |
| 8,578,042 B2 | 11/2013 | Hu et al. |
| 8,600,382 B2 | 12/2013 | Hicks, III |
| 8,631,440 B2 | 1/2014 | Gossweiler et al. |
| 8,826,443 B1 | 9/2014 | Raman et al. |
| 8,842,879 B2 | 9/2014 | Laksono et al. |
| 8,843,965 B1 | 9/2014 | Kurapati et al. |
| 8,954,521 B1 | 2/2015 | Faaborg et al. |
| 9,094,639 B2 | 7/2015 | Yim et al. |
| 9,130,918 B2 | 9/2015 | Picconi et al. |
| 9,342,668 B2 | 5/2016 | Wang et al. |
| 9,380,264 B1 | 6/2016 | Vakalapudi |
| 9,390,447 B1 | 7/2016 | Smith |
| 10,045,091 B1 | 8/2018 | Nijim et al. |
| 10,075,753 B2 | 9/2018 | Loheide et al. |
| 2002/0038457 A1 | 3/2002 | Numata et al. |
| 2002/0112239 A1 | 8/2002 | Goldman |
| 2002/0178447 A1 | 11/2002 | Plotnick et al. |
| 2003/0023757 A1 | 1/2003 | Ishioka et al. |
| 2003/0026628 A1 | 2/2003 | Arimoto |
| 2003/0051239 A1 | 3/2003 | Hudspeth |
| 2003/0110507 A1 | 6/2003 | Dimitrova et al. |
| 2003/0126600 A1 | 7/2003 | Heuvelman |
| 2003/0151538 A1 | 8/2003 | Escobosa et al. |
| 2003/0182658 A1 | 9/2003 | Alexander |
| 2003/0212708 A1 | 11/2003 | Potrebic et al. |
| 2003/0236832 A1 | 12/2003 | McIntyre et al. |
| 2004/0022278 A1 | 2/2004 | Thomas et al. |
| 2004/0031056 A1 | 2/2004 | Wolff |
| 2004/0128682 A1 | 7/2004 | Liga et al. |
| 2004/0163103 A1 | 8/2004 | Swix et al. |
| 2004/0172650 A1 | 9/2004 | Hawkins et al. |
| 2004/0172662 A1 | 9/2004 | Danker et al. |
| 2005/0015816 A1 | 1/2005 | Christofalo et al. |
| 2005/0060745 A1 | 3/2005 | Riedl et al. |
| 2005/0096978 A1 | 5/2005 | Black |
| 2005/0120369 A1 | 6/2005 | Matz |
| 2005/0132401 A1 | 6/2005 | Boccon-Gibod et al. |
| 2005/0135613 A1 | 6/2005 | Brandenburg et al. |
| 2006/0031889 A1 | 2/2006 | Bennett et al. |
| 2006/0064730 A1 | 3/2006 | Rael et al. |
| 2006/0122916 A1 | 6/2006 | Kassan |
| 2006/0287915 A1 | 12/2006 | Boulet et al. |
| 2007/0011718 A1 | 1/2007 | Nee |
| 2007/0033419 A1 | 2/2007 | Kocher et al. |
| 2007/0186228 A1 | 8/2007 | Ramaswamy et al. |
| 2007/0238035 A1 | 10/2007 | Holscher et al. |
| 2007/0250901 A1 | 10/2007 | McIntire et al. |
| 2008/0086742 A1 | 4/2008 | Aldrey et al. |
| 2008/0201735 A1 | 8/2008 | Sumiyoshi et al. |
| 2008/0271078 A1 | 10/2008 | Gossweiler et al. |
| 2008/0271080 A1 | 10/2008 | Gossweiler et al. |
| 2008/0320513 A1 | 12/2008 | Wong et al. |
| 2009/0070808 A1 | 3/2009 | Jacobs |
| 2009/0070819 A1 | 3/2009 | Gajda et al. |
| 2009/0100452 A1 | 4/2009 | Hudgeons et al. |
| 2009/0254934 A1 | 10/2009 | Grammens |
| 2009/0256972 A1 | 10/2009 | Ramaswamy et al. |
| 2009/0285217 A1 | 11/2009 | Frink et al. |
| 2009/0287790 A1 | 11/2009 | Upton et al. |
| 2010/0010899 A1 | 1/2010 | Lambert et al. |
| 2010/0125880 A1 | 5/2010 | Roewe |
| 2010/0146548 A1 | 6/2010 | Yim et al. |
| 2010/0146559 A1 | 6/2010 | Lee et al. |
| 2010/0169914 A1 | 7/2010 | Williamson et al. |
| 2010/0287297 A1 | 11/2010 | Lefebvre |
| 2010/0325655 A1 | 12/2010 | Perez |
| 2010/0325657 A1 | 12/2010 | Sellers et al. |
| 2011/0022471 A1 | 1/2011 | Brueck et al. |
| 2011/0052144 A1 | 3/2011 | Abbas et al. |
| 2011/0123062 A1 | 5/2011 | Hilu |
| 2011/0153464 A1 | 6/2011 | Hendricks et al. |
| 2011/0161500 A1 | 6/2011 | Yengalasetti et al. |
| 2011/0164115 A1 | 7/2011 | Bennett et al. |
| 2011/0177775 A1 | 7/2011 | Gupta et al. |
| 2011/0209181 A1 | 8/2011 | Gupta et al. |
| 2011/0238754 A1* | 9/2011 | Dasilva .................. G06Q 30/02 709/204 |
| 2011/0246202 A1 | 10/2011 | McMillan et al. |
| 2012/0017282 A1 | 1/2012 | Kang et al. |
| 2012/0110621 A1 | 5/2012 | Gossweiler, I |
| 2012/0143693 A1 | 6/2012 | Chung et al. |
| 2012/0192232 A1 | 7/2012 | Ellis |
| 2012/0271942 A1 | 10/2012 | Walker et al. |
| 2012/0272264 A1 | 10/2012 | Suzuki et al. |
| 2012/0284737 A1 | 11/2012 | Savoor et al. |
| 2012/0304223 A1 | 11/2012 | Sargent et al. |
| 2013/0085851 A1 | 4/2013 | Pedro et al. |
| 2013/0121487 A1 | 5/2013 | Lorberbaum et al. |
| 2013/0160051 A1 | 6/2013 | Armstrong et al. |
| 2013/0198328 A1 | 8/2013 | Green et al. |
| 2013/0205212 A1 | 8/2013 | Sinha et al. |
| 2013/0208811 A1 | 8/2013 | Liu et al. |
| 2013/0227283 A1 | 8/2013 | Williamson et al. |
| 2013/0227284 A1 | 8/2013 | Pfeffer et al. |
| 2013/0263168 A1 | 10/2013 | Choi |
| 2013/0263182 A1 | 10/2013 | Ivy et al. |
| 2013/0276023 A1 | 10/2013 | Kent et al. |
| 2013/0305287 A1 | 11/2013 | Wong et al. |
| 2013/0312041 A1 | 11/2013 | Gresta |
| 2013/0325605 A1 | 12/2013 | Callaghan et al. |
| 2014/0013354 A1 | 1/2014 | Johnson et al. |
| 2014/0020017 A1 | 1/2014 | Stern et al. |
| 2014/0032259 A1 | 1/2014 | LaFever et al. |
| 2014/0033240 A1 | 1/2014 | Card |
| 2014/0071818 A1 | 3/2014 | Wang et al. |
| 2014/0143806 A1 | 5/2014 | Steinberg et al. |
| 2014/0150019 A1 | 5/2014 | Ma et al. |
| 2014/0152894 A1 | 6/2014 | Childs et al. |
| 2014/0157312 A1 | 6/2014 | Williams et al. |
| 2014/0173666 A1 | 6/2014 | Gordon et al. |
| 2014/0186001 A1 | 7/2014 | Aldrey et al. |
| 2014/0189514 A1 | 7/2014 | Hilliard |
| 2014/0189743 A1 | 7/2014 | Kennedy et al. |
| 2014/0189754 A1 | 7/2014 | Major et al. |
| 2014/0237243 A1 | 8/2014 | Ma et al. |
| 2014/0270338 A1 | 9/2014 | Zhao et al. |
| 2014/0282723 A1 | 9/2014 | Sinha et al. |
| 2014/0310745 A1 | 10/2014 | Canney et al. |
| 2014/0317666 A1 | 10/2014 | Chiarulli et al. |
| 2014/0351843 A1 | 11/2014 | Theriault |
| 2014/0359656 A1 | 12/2014 | Banica et al. |
| 2014/0366068 A1 | 12/2014 | Burkitt et al. |
| 2015/0012926 A1 | 1/2015 | Wei et al. |
| 2015/0033255 A1 | 1/2015 | Neumann et al. |
| 2015/0058874 A1 | 2/2015 | Sun et al. |
| 2015/0074732 A1 | 3/2015 | Green et al. |
| 2015/0106856 A1 | 4/2015 | Rankine |
| 2015/0127845 A1* | 5/2015 | Phillips ............ H04N 21/26258 709/231 |
| 2015/0237386 A1 | 8/2015 | Sheehan et al. |
| 2015/0237389 A1 | 8/2015 | Grout et al. |
| 2015/0249865 A1 | 9/2015 | Oliveira |
| 2015/0271234 A1 | 9/2015 | O'Malley et al. |
| 2015/0289022 A1 | 10/2015 | Gross |

(56) References Cited

U.S. PATENT DOCUMENTS

| | | |
|---|---|---|
| 2015/0381936 A1 | 12/2015 | Goyal et al. |
| 2015/0382042 A1 | 12/2015 | Wagenaar et al. |
| 2015/0382047 A1 | 12/2015 | Os et al. |
| 2015/0382274 A1 | 12/2015 | Logvinov et al. |
| 2016/0029055 A1 | 1/2016 | Nunez et al. |
| 2016/0063530 A1 | 3/2016 | Lin |
| 2016/0073155 A1 | 3/2016 | Subramaniam et al. |
| 2016/0077710 A1 | 3/2016 | Lewis et al. |
| 2016/0105477 A1 | 4/2016 | Holden et al. |
| 2016/0112740 A1 | 4/2016 | Francisco et al. |
| 2016/0127786 A1 | 5/2016 | Langer |
| 2016/0127788 A1 | 5/2016 | Roberts et al. |
| 2016/0142783 A1 | 5/2016 | Bagga et al. |
| 2016/0150290 A1 | 5/2016 | Chandler et al. |
| 2016/0165306 A1 | 6/2016 | Nam |
| 2016/0182954 A1 | 6/2016 | Nguyen et al. |
| 2016/0198202 A1 | 7/2016 | Brandenburg et al. |
| 2016/0227260 A1 | 8/2016 | Hundemer et al. |
| 2016/0255391 A1 | 9/2016 | Noble |
| 2016/0308958 A1 | 10/2016 | Navali et al. |
| 2016/0316247 A1 | 10/2016 | Biagini et al. |
| 2016/0345074 A1 | 11/2016 | Serbest et al. |
| 2017/0055012 A1 | 2/2017 | Phillips et al. |
| 2017/0064400 A1* | 3/2017 | Riegel ............... H04N 21/2743 |
| 2017/0070789 A1 | 3/2017 | Liassides et al. |
| 2017/0085935 A1 | 3/2017 | Riedel et al. |
| 2017/0099506 A1 | 4/2017 | Grover |
| 2017/0099511 A1 | 4/2017 | Grover |
| 2017/0099525 A1 | 4/2017 | Ray et al. |
| 2017/0118537 A1 | 4/2017 | Stransky-Heilkron et al. |
| 2017/0118538 A1 | 4/2017 | Ashbacher |
| 2017/0164019 A1 | 6/2017 | Oh et al. |
| 2017/0171610 A1 | 6/2017 | Nair et al. |
| 2017/0193544 A1 | 7/2017 | Glasgow et al. |
| 2017/0195718 A1 | 7/2017 | Nair et al. |
| 2017/0201779 A1 | 7/2017 | Publicover et al. |
| 2017/0238035 A1 | 8/2017 | Perez |
| 2017/0257446 A1 | 9/2017 | Bevilacqua et al. |
| 2017/0289597 A1 | 10/2017 | Riedel et al. |
| 2018/0007060 A1 | 1/2018 | Leblang et al. |
| 2018/0048599 A1 | 2/2018 | Arghandiwal et al. |
| 2018/0131986 A1 | 5/2018 | Cole et al. |
| 2018/0165650 A1 | 6/2018 | Kashyape et al. |
| 2018/0184047 A1 | 6/2018 | Simonsen et al. |
| 2018/0300751 A1 | 10/2018 | Hammitt et al. |
| 2018/0343505 A1 | 11/2018 | Loheide et al. |
| 2018/0367823 A1 | 12/2018 | Brinkley et al. |
| 2019/0068665 A1 | 2/2019 | Kieft et al. |
| 2019/0364317 A1 | 11/2019 | Milford |
| 2019/0380021 A1 | 12/2019 | Meek et al. |
| 2020/0059308 A1 | 2/2020 | Cox et al. |
| 2020/0244778 A1 | 7/2020 | Berookhim et al. |

OTHER PUBLICATIONS

Corrected Notice of Allowance for U.S. Appl. No. 16/985,444 dated Apr. 20, 2022.
Corrected Notice of Allowance for U.S. Appl. No. 16/985,444 dated Jun. 1, 2022.
Corrected Notice of Allowance for U.S. Appl. No. 16/985,444 dated Mar. 25, 2022.
Corrected Notice of Allowance for U.S. Appl. No. 17/016,789 dated May 18, 2022.
Corrected Notice of Allowance for U.S. Appl. No. 17/017,145 dated Jun. 2, 2022.
Corrected Notice of Allowance for U.S. Appl. No. 17/017,145 dated May 17, 2022.
Corrected Notice of Allowance for U.S. Appl. No. 17/038,323 dated Apr. 19, 2022.
Corrected Notice of Allowance for U.S. Appl. No. 17/038,323 dated May 26, 2022.
Corrected Notice of Allowance for U.S. Appl. No. 17/094,102 dated Apr. 20, 2022.
Corrected Notice of Allowance for U.S. Appl. No. 17/094,102 dated Mar. 10, 2022.
Corrected Notice of Allowance for U.S. Appl. No. 17/094,102 dated May 17, 2022.
Corrected Notice of Allowance for U.S. Appl. No. 17/094,319 dated May 17, 2022.
Corrected Notice of Allowance for U.S. Appl. No. 17/147,887 dated May 18, 2022.
Corrected Notice of Allowance for U.S. Appl. No. 17/326,258 dated Apr. 19, 2022.
Corrected Notice of Allowance for U.S. Appl. No. 17/326,258 dated Mar. 14, 2022.
Corrected Notice of Allowance for U.S. Appl. No. 17/340,166 dated Jun. 2, 2022.
Final Office Action for U.S. Appl. No. 15/988,572 dated Mar. 10, 2022.
Final Office Action for U.S. Appl. No. 17/017,241 dated Apr. 28, 2022.
Non-Final Office Action for U.S. Appl. No. 16/918,085 dated Mar. 31, 2022.
Notice of Allowability for U.S. Appl. No. 16/092,893 dated Jun. 8, 2022.
Notice of Allowability for U.S. Appl. No. 16/895,439 dated Jun. 8, 2022.
Notice of Allowability for U.S. Appl. No. 16/895,439 dated May 16, 2022.
Notice of Allowability for U.S. Appl. No. 16/902,893 dated May 13, 2022.
Notice of Allowance for U.S. Appl. No. 15/396,468 dated Mar. 18, 2022.
Notice of Allowance for U.S. Appl. No. 17/094,319 dated Apr. 12, 2022.
Notice of Allowance for U.S. Appl. No. 17/147,887 dated Apr. 19, 2022.
Notice of Allowance for U.S. Appl. No. 17/326,258 dated Apr. 27, 2022.
Notice of Allowance for U.S. Appl. No. 17/340,166 dated Mar. 21, 2022.
Advisory Action for U.S. Appl. No. 15/396,475 dated May 13, 2020.
Advisory Action for U.S. Appl. No. 15/396,475 dated Jun. 3, 2019.
Advisory Action for U.S. Appl. No. 15/988,308 dated Jul. 16, 2019.
Advisory Action for U.S. Appl. No. 15/396,468 dated Jan. 16, 2020.
Advisory Action for U.S. Appl. No. 15/396,614 dated Oct. 24, 2019.
Advisory Action for U.S. Appl. No. 15/986,218 dated Jul. 12, 2019.
Advisory Action for U.S. Appl. No. 15/986,361 dated Feb. 26, 2020.
Advisory Action for U.S. Appl. No. 15/986,451 dated Feb. 20, 2020.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice of Allowability for U.S. Appl. No. 16/230,493 dated Jul. 8, 2021.
Corrected Notice of Allowance for U.S. Appl. No. 16/902,775 dated Jul. 30, 2021.
Corrected Notice of Allowance for U.S. Appl. No. 15/396,453 dated Jun. 3, 2019.
Corrected Notice of Allowance for U.S. Appl. No. 15/396,453 dated Aug. 21, 2019.
Corrected Notice of Allowance for U.S. Appl. No. 15/396,475 dated Aug. 24, 2021.
Corrected Notice of Allowance for U.S. Appl. No. 15/396,475 dated Jul. 12, 2021.
Corrected Notice of Allowance for U.S. Appl. No. 15/396,624 dated Sep. 5, 2019.
Corrected Notice of Allowance for U.S. Appl. No. 15/986,286 dated May 27, 2021.
Corrected Notice of Allowance for U.S. Appl. No. 15/986,406 dated Jul. 16, 2021.
Corrected Notice of Allowance for U.S. Appl. No. 15/986,451 dated Aug. 11, 2021.
Corrected Notice of Allowance for U.S. Appl. No. 15/988,241 dated Aug. 13, 2020.

(56) References Cited

OTHER PUBLICATIONS

Corrected Notice of Allowance for U.S. Appl. No. 15/988,241 dated Jun. 22, 2020.
Corrected Notice of Allowance for U.S. Appl. No. 15/988,241 dated May 8, 2020.
Corrected Notice of Allowance for U.S. Appl. No. 15/988,241 dated Nov. 18, 2020.
Corrected Notice of Allowance for U.S. Appl. No. 16/128,104 dated Apr. 15, 2020.
Corrected Notice of Allowance for U.S. Appl. No. 16/128,104 dated Jul. 8, 2020.
Corrected Notice of Allowance for U.S. Appl. No. 16/128,104 dated May 20, 2020.
Corrected Notice of Allowance for U.S. Appl. No. 16/229,310 dated Apr. 27, 2021.
Corrected Notice of Allowance for U.S. Appl. No. 16/229,310 dated Jun. 3, 2021.
Corrected Notice of Allowance for U.S. Appl. No. 16/229,497 dated Jun. 3, 2021.
Corrected Notice of Allowance for U.S. Appl. No. 16/229,614 dated Jun. 29, 2021.
Corrected Notice of Allowance for U.S. Appl. No. 16/230,268 dated Dec. 2, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/234,870 dated Feb. 24, 2021.
Corrected Notice of Allowance for U.S. Appl. No. 16/234,870 dated Jan. 15, 2021.
Corrected Notice of Allowance for U.S. Appl. No. 16/235,445 dated Mar. 26, 2021.
Corrected Notice of Allowance for U.S. Appl. No. 16/236,673 dated Oct. 23, 2020.
Corrected Notice of Allowance for U.S. Appl. No. 16/236,673 dated Sep. 21, 2020.
Corrected Notice of Allowance for U.S. Appl. No. 16/236,713 dated Apr. 8, 2021.
Corrected Notice of Allowance for U.S. Appl. No. 16/236,713 dated May 17, 2021.
Corrected Notice of Allowance for U.S. Appl. No. 16/902,775 dated Apr. 26, 2021.
Corrected Notice of Allowance for U.S. Appl. No. 16/902,775 dated Apr. 9, 2021.
Corrected Notice of Allowance for U.S. Appl. No. 16/902,775 dated Jun. 11, 2021.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Corrected Notice of Allowance in U.S. Appl. No. 15/396,453 dated Jun. 13, 2019.
Final Office Action for U.S. Appl. No. 15/988,308 dated May 6, 2020.
Final Office Action for U.S. Appl. No. 15/988,572 dated May 12, 2021.
Final Office Action for U.S. Appl. No. 15/986,218 dated Apr. 24, 2019.
Final Office Action for U.S. Appl. No. 15/988,308 dated May 9, 2019.
Final Office Action for U.S. Appl. No. 15/396,468 dated Feb. 10, 2021.
Final Office Action for U.S. Appl. No. 15/396,468 dated Nov. 6, 2019.
Final Office Action for U.S. Appl. No. 15/396,475 dated Feb. 4, 2020.
Final Office Action for U.S. Appl. No. 15/396,614 dated Aug. 12, 2019.
Final Office Action for U.S. Appl. No. 15/986,218 dated Jan. 31, 2020.
Final Office Action for U.S. Appl. No. 15/986,286 dated Jun. 9, 2020.
Final Office Action for U.S. Appl. No. 15/986,361 dated Dec. 23, 2019.
Final Office Action for U.S. Appl. No. 15/986,406 dated May 26, 2020.
Final Office Action for U.S. Appl. No. 15/986,451 dated Dec. 16, 2019.
Final Office Action for U.S. Appl. No. 15/986,451 dated Sep. 29, 2020.
Final Office Action for U.S. Appl. No. 15/988,241 dated Jan. 8, 2020.
Final Office Action for U.S. Appl. No. 15/988,308 dated Jan. 28, 2021.
Final Office Action for U.S. Appl. No. 15/988,492 dated Jan. 6, 2021.
Final Office Action for U.S. Appl. No. 15/988,492 dated May 28, 2020.
Final Office Action for U.S. Appl. No. 15/988,572 dated Jul. 2, 2020.
Final Office Action for U.S. Appl. No. 16/229,310 dated Jun. 11, 2020.
Final Office Action for U.S. Appl. No. 16/229,497 dated Jun. 11, 2020.
Final Office Action for U.S. Appl. No. 16/229,614 dated Jul. 9, 2020.
Final Office Action for U.S. Appl. No. 16/230,268 dated Apr. 17, 2020.
Final Office Action for U.S. Appl. No. 16/234,870 dated Jul. 9, 2020.
Final Office Action for U.S. Appl. No. 16/235,445 dated Sep. 3, 2200.
Final Office Action for U.S. Appl. No. 16/236,713 dated Sep. 30, 2020.
Final Office Action for U.S. Appl. No. 16/854,970 dated Aug. 18, 2021.
Final Office Action in U.S. Appl. No. 15/396,468 dated Nov. 15, 2018.
Final Office Action in U.S. Appl. No. 15/396,475 dated Feb. 25, 2019.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/986,218 dated Apr. 24, 2019.
Final Office Action in U.S. Appl. No. 15/396,624 dated Jan. 24, 2019.
Non-Final Office Action for U.S. Appl. No. 15/986,361 dated Jul. 11, 2019.
Non-Final Office Action for U.S. Appl. No. 15/986,451 dated Jun. 27, 2019.
Non-Final Office Action for U.S. Appl. No. 15/988,241 dated Jun. 27, 2019.
Non-Final Office Action for U.S. Appl. No. 16/918,085 dated Aug. 19, 2021.
Non-Final Office Action for U.S. Appl. No. 15/396,468 dated Feb. 4, 2020.
Non-Final Office Action for U.S. Appl. No. 15/396,468 dated Jun. 1, 2021.
Non-Final Office Action for U.S. Appl. No. 15/396,475 dated Aug. 6, 2020.
Non-Final Office Action for U.S. Appl. No. 15/396,475 dated Aug. 8, 2019.
Non-Final Office Action for U.S. Appl. No. 15/396,624 dated Oct. 16, 2019.
Non-Final Office Action for U.S. Appl. No. 15/986,218 dated Sep. 27, 2019.

(56) References Cited

OTHER PUBLICATIONS

Non-Final Office Action for U.S. Appl. No. 15/986,406 dated Dec. 18, 2019.
Non-Final Office Action for U.S. Appl. No. 15/986,406 dated Oct. 30, 2020.
Non-Final Office Action for U.S. Appl. No. 15/986,451 dated Apr. 16, 2020.
Non-Final Office Action for U.S. Appl. No. 15/986,286 dated Nov. 29, 2019.
Non-Final Office Action for U.S. Appl. No. 15/988,308 dated Dec. 3, 2019.
Non-Final Office Action for U.S. Appl. No. 15/988,308 dated Sep. 8, 2020.
Non-Final Office Action for U.S. Appl. No. 15/988,472 dated Dec. 27, 2019.
Corrected Notice of Allowance for U.S. Appl. No. 15/986,451 dated Nov. 16, 2021.
Corrected Notice of Allowance for U.S. Appl. No. 15/988,308 dated Oct. 20, 2021.
Corrected Notice of Allowance for U.S. Appl. No. 15/988,492 dated Oct. 20, 2021.
Final Office Action for U.S. Appl. No. 15/396,468 dated Dec. 2, 2021.
Final Office Action for U.S. Appl. No. 17/038,323 dated Nov. 1, 2021.
Non-Final Office Action for U.S. Appl. No. 16/985,444 dated Sep. 3, 2021.
Non-Final Office Action for U.S. Appl. No. 17/094,102 dated Sep. 20, 2021.
Notice of Allowance for U.S. Appl. No. 17/326,258 dated Nov. 17, 2021.
Supplemental Notice of Allowance for U.S. Appl. No. 15/988,492 dated Nov. 9, 2021.
Corrected Notice of Allowance for U.S. Appl. No. 15/986,451 dated Jan. 5, 2022.
Corrected Notice of Allowance for U.S. Appl. No. 15/988,308 dated Dec. 22, 2021.
Corrected Notice of Allowance for U.S. Appl. No. 15/988,308 dated Jan. 24, 2022.
Corrected Notice of Allowance for U.S. Appl. No. 15/988,308 dated Mar. 2, 2022.
Corrected Notice of Allowance for U.S. Appl. No. 15/988,492 dated Dec. 3, 2021.
Corrected Notice of Allowance for U.S. Appl. No. 17/017,145 dated Mar. 4, 2022.
Corrected Notice of Allowance for U.S. Appl. No. 17/038,323 dated Feb. 2, 2022.
Corrected Notice of Allowance for U.S. Appl. No. 17/326,258 dated Dec. 22, 2021.
Corrected Notice of Allowance for U.S. Appl. No. 17/326,258 dated Feb. 25, 2022.
Corrected Notice of Allowance for U.S. Appl. No. 17/326,258 dated Mar. 2, 2022.
Final Office Action for U.S. Appl. No. 16/918,085 dated Dec. 8, 2021.
Non-Final Office Action for U.S. Appl. No. 16/854,970 dated Feb. 17, 2022.
Non-Final Office Action for U.S. Appl. No. 17/017,052 dated Dec. 27, 2021.
Non-Final Office Action for U.S. Appl. No. 17/017,145 dated Dec. 22, 2021.
Non-Final Office Action for U.S. Appl. No. 17/017,241 dated Dec. 20, 2021.
Non-Final Office Action for U.S. Appl. No. 17/094,319 dated Dec. 8, 2021.
Non-Final Office Action for U.S. Appl. No. 17/147,887 dated Dec. 22, 2021.
Non-Final Office Acton for U.S. Appl. No. 17/016,789 dated Dec. 21, 2021.
Notice of Allowance for U.S. Appl. No. 16/895,439 dated Mar. 1, 2022.
Notice of Allowance for U.S. Appl. No. 16/902,893 dated Feb. 25, 2022.
Notice of Allowance for U.S. Appl. No. 16/985,444 dated Jan. 10, 2022.
Notice of Allowance for U.S. Appl. No. 17/016,789 dated Feb. 11, 2022.
Notice of Allowance for U.S. Appl. No. 17/017,052 dated Feb. 11, 2022.
Notice of Allowance for U.S. Appl. No. 17/017,145 dated Feb. 16, 2022.
Notice of Allowance for U.S. Appl. No. 17/038,323 dated Jan. 12, 2022.
Notice of Allowance for U.S. Appl. No. 17/094,102 dated Jan. 14, 2022.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Notice of Allowance in U.S. Appl. No. 16/236,673 dated May 1, 2020.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Restriction Requirement for U.S. Appl. No. 16/231,467 dated Feb. 5, 2020.
Supplemental Notice of Allowance for U.S. Appl. No. 15/396,624 dated Aug. 14, 2019.
Supplemental Notice of Allowance for U.S. Appl. No. 15/986,218 dated Jan. 27, 2021.
Supplemental Notice of Allowance for U.S. Appl. No. 15/986,406 dated Apr. 7, 2021.
Supplemental Notice of Allowance for U.S. Appl. No. 15/986,406 dated Jun. 9, 2021.
Corrected Notice of Allowance for U.S. Appl. No. 15/396,468 dated Aug. 26, 2022.
Corrected Notice of Allowance for U.S. Appl. No. 15/396,468 dated Jun. 24, 2022.
Corrected Notice of Allowance for U.S. Appl. No. 16/895,439 dated Sep. 14, 2022.
Corrected Notice of Allowance for U.S. Appl. No. 17/016,789 dated Jun. 27, 2022.
Corrected Notice of Allowance for U.S. Appl. No. 17/017,052 dated Aug. 1, 2022.
Corrected Notice of Allowance for U.S. Appl. No. 17/017,052 dated Jun. 15, 2022.
Corrected Notice of Allowance for U.S. Appl. No. 17/017,145 dated Jul. 22, 2022.
Corrected Notice of Allowance for U.S. Appl. No. 17/017,145 dated Sep. 15, 2022.
Corrected Notice of Allowance for U.S. Appl. No. 17/017,241 dated Aug. 3, 2022.
Corrected Notice of Allowance for U.S. Appl. No. 17/094,102 dated Aug. 3, 2022.
Corrected Notice of Allowance for U.S. Appl. No. 17/094,102 dated Jun. 24, 2022.
Corrected Notice of Allowance for U.S. Appl. No. 17/094,319 dated Aug. 1, 2022.
Corrected Notice of Allowance for U.S. Appl. No. 17/094,319 dated Jun. 15, 2022.
Corrected Notice of Allowance for U.S. Appl. No. 17/147,887 dated Jul. 22, 2022.
Corrected Notice of Allowance for U.S. Appl. No. 17/340,166 dated Aug. 22, 2022.
Corrected Notice of Allowance for U.S. Appl. No. 17/340,166 dated Jul. 5, 2022.
Final Office Action for U.S. Appl. No. 16/854,970 dated Aug. 18, 2022.
Final Office Action for U.S. Appl. No. 17/206,473 dated Sep. 8, 2022.

(56) References Cited

OTHER PUBLICATIONS

Non-Final Office Action for U.S. Appl. No. 17/206,473 dated Jun. 22, 2022.
Non-Final Office Action for U.S. Appl. No. 17/206,737 dated Jun. 23, 2022.
Non-Final Office Action for U.S. Appl. No. 17/408,680 dated Sep. 15, 2022.
Non-Final Office Action for U.S. Appl. No. 17/527,817 dated Jun. 15, 2022.
Notice of Allowability for U.S. Appl. No. 16/895,439 dated Jul. 20, 2022.
Notice of Allowability for U.S. Appl. No. 16/902,893 dated Jul. 20, 2022.
Notice of Allowance for U.S. Appl. No. 17/017,241 dated Jul. 15, 2022.
Notice of Allowance for U.S. Appl. No. 17/340,677 dated Aug. 8, 2022.
Non-Final Office Action for U.S. Appl. No. 15/988,492 dated Apr. 14, 2021.
Non-Final Office Action for U.S. Appl. No. 15/988,492 dated Feb. 18, 2020.
Non-Final Office Action for U.S. Appl. No. 15/988,492 dated Sep. 10, 2020.
Non-Final Office Action for U.S. Appl. No. 15/988,572 dated Aug. 25, 2021.
Non-Final Office Action for U.S. Appl. No. 15/988,572 dated Nov. 6, 2020.
Non-Final Office Action for U.S. Appl. No. 16/128,104 dated Aug. 21, 2019.
Non-Final Office Action for U.S. Appl. No. 16/229,310 dated Nov. 29, 2019.
Non-Final Office Action for U.S. Appl. No. 16/229,497 dated Dec. 12, 2019.
Non-Final Office Action for U.S. Appl. No. 16/229,614 dated Mar. 19, 2020.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/235,445 dated Apr. 2, 2020.
Non-Final Office Action for U.S. Appl. No. 16/236,673 dated Jan. 10, 2020.
Non-Final Office Action for U.S. Appl. No. 16/236,713 dated May 29, 2020.
Non-Final Office Action for U.S. Appl. No. 16/854,970 dated Mar. 17, 2021.
Non-Final Office Action for U.S. Appl. No. 16/902,775 dated Oct. 5, 2020.
Non-Final Office Action for U.S. Appl. No. 17/038,323 dated Jul. 1, 2021.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,468 dated Mar. 1, 2019.
Non-Final Office Action in U.S. Appl. No. 15/396,475 dated Nov. 30, 2018.
Non-Final Office Action in U.S. Appl. No. 15/396,614 dated Mar. 7, 2019.
Non-Final Office Action in U.S. Appl. No. 15/396,614 dated May 18, 2018.
Non-Final Office Action in U.S. Appl. No. 15/396,624 dated Jul. 13, 2018.
Non-Final Office Action in U.S. Appl. No. 15/986,218 dated Nov. 28, 2018.
Notice of Allowability for U.S. Appl. No. 15/986,361 dated Aug. 18, 2020.
Notice of Allowability for U.S. Appl. No. 15/986,361 dated Jul. 14, 2020.
Notice of Allowability for U.S. Appl. No. 15/986,361 dated May 15, 2020.
Notice of Allowability for U.S. Appl. No. 15/986,361 dated Sep. 30, 2020.
Notice of Allowance for U.S. Appl. No. 15/396,624 dated May 31, 2019.
Notice of Allowance for U.S. Appl. No. 15/396,475 dated Feb. 5, 2021.
Notice of Allowance for U.S. Appl. No. 15/986,218 dated Jul. 13, 2020.
Notice of Allowance for U.S. Appl. No. 15/986,361 dated Apr. 8, 2020.
Notice of Allowance for U.S. Appl. No. 15/986,406 dated Mar. 3, 2021.
Notice of Allowance for U.S. Appl. No. 15/986,451 dated May 5, 2021.
Notice of Allowance for U.S. Appl. No. 15/988,241 dated Aug. 26, 2020.
Notice of Allowance for U.S. Appl. No. 15/988,241 dated Mar. 18, 2020.
Notice of Allowance for U.S. Appl. No. 15/988,308 dated Jul. 30, 2021.
Notice of Allowance for U.S. Appl. No. 15/988,492 dated Jul. 30, 2021.
Notice of Allowance for U.S. Appl. No. 16/128,104 dated Dec. 12, 2019.
Notice of Allowance for U.S. Appl. No. 16/229,310 dated Dec. 14, 2020.
Notice of Allowance for U.S. Appl. No. 16/229,497 dated Dec. 30, 2020.
Notice of Allowance for U.S. Appl. No. 16/229,614 dated Feb. 18, 2021.
Notice of Allowance for U.S. Appl. No. 16/230,268 dated Aug. 24, 2020.
Notice of Allowance for U.S. Appl. No. 16/230,493 dated Feb. 12, 2021.
Notice of Allowance for U.S. Appl. No. 16/231,467 dated Apr. 16, 2020.
Notice of Allowance for U.S. Appl. No. 16/234,870 dated Aug. 19, 2020.
Notice of Allowance for U.S. Appl. No. 16/235,445 dated Nov. 4, 2020.
Notice of Allowance for U.S. Appl. No. 16/236,713 dated Nov. 18, 2020.
Notice of Allowance for U.S. Appl. No. 16/902,775 dated Feb. 2, 2021.
Corrected Notice of Allowance for U.S. Appl. No. 15/396,468 dated Oct. 17, 2022.
Corrected Notice of Allowance for U.S. Appl. No. 16/902,893 dated Sep. 19, 2022.
Corrected Notice of Allowance for U.S. Appl. No. 17/017,241 dated Dec. 2, 2022.
Corrected Notice of Allowance for U.S. Appl. No. 17/017,241 dated Oct. 20, 2022.
Corrected Notice of Allowance for U.S. Appl. No. 17/094,319 dated Sep. 23, 2022.
Corrected Notice of Allowance for U.S. Appl. No. 17/147,887 dated Oct. 11, 2022.
Corrected Notice of Allowance for U.S. Appl. No. 17/340,166 dated Sep. 23, 2022.
Corrected Notice of Allowance for U.S. Appl. No. 17/340,677 dated Dec. 9, 2022.
Corrected Notice of Allowance for U.S. Appl. No. 17/340,677 dated Nov. 14, 2022.
Corrected Notice of Allowance for U.S. Appl. No. 17/340,677 dated Oct. 21, 2022.
Corrected Notice of Allowance for U.S. Appl. No. 17/688,666 dated Dec. 14, 2022.
Final Office Action for U.S. Appl. No. 16/918,085 dated Oct. 24, 2022.

(56) References Cited

OTHER PUBLICATIONS

Non-Final Office Action for U.S. Appl. No. 15/988,572 dated Oct. 6, 2022.
Non-Final Office Action for U.S. Appl. No. 17/016,789 dated Sep. 22, 2022.
Non-Final Office Action for U.S. Appl. No. 17/340,538 dated Oct. 3, 2022.
Non-Final Office Action for U.S. Appl. No. 17/366,738 dated Dec. 9, 2022.
Non-Final Office Action for U.S. Appl. No. 17/453,628 dated Sep. 27, 2022.
Non-Final Office Action for U.S. Appl. No. 17/830,587 dated Nov. 25, 2022.
Notice of Allowance for U.S. Appl. No. 16/854,970 dated Oct. 13, 2022.
Notice of Allowance for U.S. Appl. No. 17/306,758 dated Sep. 16, 2022.
Notice of Allowance for U.S. Appl. No. 17/527,817 dated Oct. 3, 2022.
Notice of Allowance for U.S. Appl. No. 17/688,666 dated Sep. 20, 2022.
Notice of Allowance for U.S. Appl. No. 17/830,788 dated Dec. 9, 2022.
Notice of Allowance for U.S. Appl. No. 17/839,649 dated Oct. 19, 2022.
Notice of Allowance for U.S. Appl. No. 17/839,882 dated Oct. 26, 2022.
Notice of Allowance for U.S. Appl. No. 17/858,698 dated Oct. 4, 2022.
Corrected Notice of Allowance for U.S. Appl. No. 16/854,970 dated Jan. 23, 2023.
Corrected Notice of Allowance for U.S. Appl. No. 16/854,970 dated Jan. 5, 2023.
Corrected Notice of Allowance for U.S. Appl. No. 17/306,758 dated Dec. 21, 2022.
Corrected Notice of Allowance for U.S. Appl. No. 17/306,758 dated Feb. 15, 2023.
Corrected Notice of Allowance for U.S. Appl. No. 17/306,758 dated Jan. 5, 2023.
Corrected Notice of Allowance for U.S. Appl. No. 17/340,256 dated Feb. 13, 2023.
Corrected Notice of Allowance for U.S. Appl. No. 17/340,256 dated Jan. 6, 2023.
Corrected Notice of Allowance for U.S. Appl. No. 17/340,538 dated Feb. 15, 2023.
Corrected Notice of Allowance for U.S. Appl. No. 17/688,666 dated Dec. 28, 2022.
Corrected Notice of Allowance for U.S. Appl. No. 17/688,666 dated Feb. 10, 2023.
Corrected Notice of Allowance for U.S. Appl. No. 17/839,882 dated Dec. 23, 2022.
Corrected Notice of Allowance for U.S. Appl. No. 17/858,698 dated Dec. 28, 2022.
Corrected Notice of Allowance for U.S. Appl. No. 17/858,698 dated Jan. 12, 2023.
Final Office Action for U.S. Appl. No. 17/206,737 dated Jan. 5, 2023.
Final Office Action for U.S. Appl. No. 17/408,680 dated Jan. 12, 2023.
Final Office Action for U.S. Appl. No. 17/408,739 dated Jan. 12, 2023.
Non-Final Office Action for U.S. Appl. No. 17/206,473 dated Dec. 22, 2022.
Non-Final Office Action for U.S. Appl. No. 17/708,241 dated Dec. 20, 2022.
Notice of Allowability for U.S. Appl. No. 17/839,649 dated Jan. 25, 2023.
Notice of Allowance for U.S. Appl. No. 16/918,085 dated Jan. 13, 2023.
Notice of Allowance for U.S. Appl. No. 17/340,538 dated Jan. 23, 2023.
Supplemental Notice of Allowance for U.S. Appl. No. 17/527,817 dated Feb. 28, 2023.
Supplemental Notice of Allowance for U.S. Appl. No. 17/527,817 dated Jan. 5, 2023.
Notice of Allowance for U.S. Appl. No. 17/453,628 dated Mar. 2, 2023.
Notice of Allowance for U.S. Appl. No. 17/731,049 dated Mar. 2, 2023.
Notice of Allowability for U.S. Appl. No. 16/918,085 dated Mar. 1, 2023.

\* cited by examiner

CREATION OF CHANNELS USING PRE-ENCODED MEDIA ASSETS

CROSS-REFERENCE TO RELATED APPLICATIONS/INCORPORATION BY REFERENCE

This patent application is a Continuation of U.S. patent application Ser. No. 15/396,475, filed on Dec. 31, 2016.
This application makes reference to:
U.S. application Ser. No. 15/396,453, filed on Dec. 31, 2016;
U.S. application Ser. No. 15/396,462, filed on Dec. 31, 2016; and
U.S. application Ser. No. 15/396,468, filed on Dec. 31, 2016.
Each of the above referenced patent applications is hereby incorporated herein by reference in its entirety.

FIELD OF TECHNOLOGY

Certain embodiments of the disclosure relate to television content packaging and distribution system. More specifically, certain embodiments of the disclosure relate to a method and system for creation of channels using pre-encoded media assets.

BACKGROUND

Advancements in the television and broadcasting sector have led to the development of various technologies and broadcasting platforms that are changing the way consumers access and view media content. Broadcasting platforms usually refers to the types of networks that are used to deliver the television signal to the viewer. Currently, all the broadcasting platforms, such as analogue terrestrial broadcast, digital terrestrial broadcast, direct-to-home satellite broadcast, cable, Internet Protocol (IP), and over-the-top television (OTT), compete and strive to increase their appeal in order to gain wider audience. The television viewing market is no longer exclusively concerned with whether media content services are viewed on a dedicated television or another device capable of playing media content. As a result of penetration of new technologies in the television, radio, and broadcasting sector, it is evident that the success of broadcasting will be dependent on the ability of the network provider to gain access to the content that consumers demand, and to differentiate their offering from that of incumbent broadcasters or find new modes of content delivery.

Traditionally, a network provider (network operator) usually decides what content to distribute in the upcoming broadcast year and when to air them. A programming schedule defines what to broadcast and when, ensuring an adequate or maximum utilization of airtime. Accordingly, the media content is packaged into brands, or organized into channels to be delivered to consumers. Increased competition has led the broadcast providers (or the network providers) to differentiate their offering and handle multiple channels at the same time, which in turn have added unparalleled levels of complexity. This required installation of large infrastructures and resources to maintain uninterrupted content delivery for existing channels and also meet the ever-increasing demand of new channels. Thus, an advanced system may be required that provides the network provider with an ability to not only provide new channel offerings in cost-effective manner but also provide enhanced viewer experience to increase their appeal in order to gain wider audience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for creation of channels using pre-encoded media assets, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for creation of channels using pre-encoded media assets. Various embodiments of the disclosure provide a method and system that simplifies channel creation, and provides the network provider with an ability to not only provide new channel offerings in cost-effective manner but also provide enhanced viewer experience to increase their appeal in order to gain wider audience.

In accordance with various embodiments of the disclosure, a media content packaging and distribution system is provided that handles distribution of one or more channels to be viewed on one or more of a plurality of consumer devices. The media content packaging and distribution system receives a media feed and a first programming schedule of a first channel of the one or more of the plurality channels from a source device. One or more pre-encoded media assets to be inserted in the media feed of the first channel may be selected based on one or more defined selection parameters. A plurality of new channels is dynamically created based on insertion of the selected one or more pre-encoded media assets in different channels of the plurality of new channels and based on the one or more defined selection parameters.

In accordance with an embodiment, the one or more defined selection parameters may correspond to user-preferences received from the one or more of the plurality of consumer devices on which the first channel is viewed. The one or more defined selection parameters may further correspond to a received input that corresponds to user-selections on the one or more of the plurality of consumer devices. The one or more defined selection parameters may further correspond to audience-based parameters received from an external data source over a network. The first programming schedule may be modified based on the insertion of the selected one or more pre-encoded media assets in different channels to generate a plurality of programming schedules for the plurality of new channels. The selected one or more pre-encoded media assets may be stitched with encoded live media assets that corresponds to the received media feed of the first channel. The selected one or more pre-encoded media assets may be stitched to create a program stream for a new channel that is in a suitable state to be distributed on the one or more of the plurality of consumer devices independent of a requirement to re-encode the pre-encoded media assets for the distribution of the program stream.

Figure 1A:
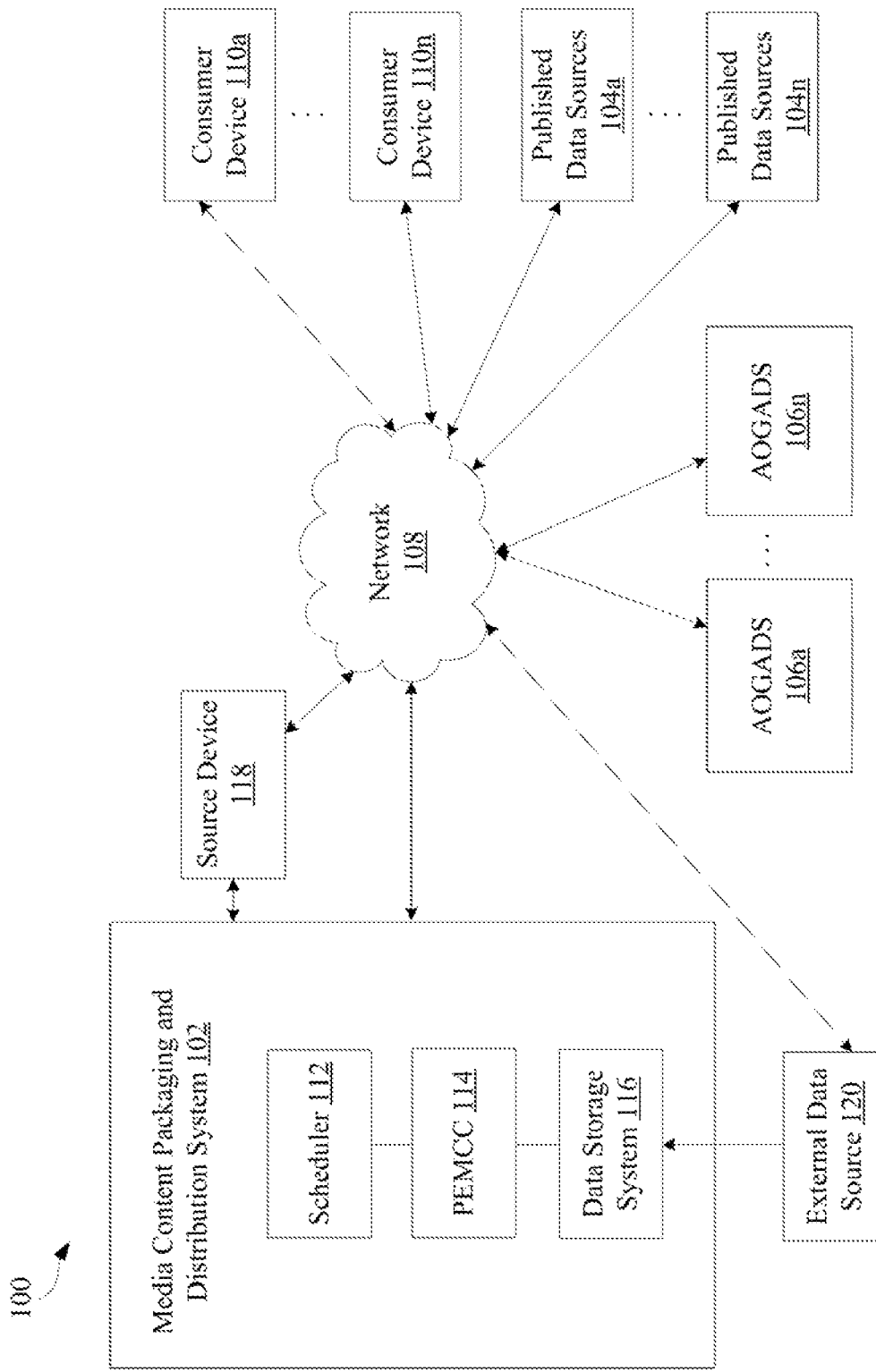
FIG. 1A is a block diagram that illustrates an exemplary system for dynamic scheduling and channel creation, in accordance with an exemplary embodiment of the disclosure.

FIG. 1A is a block diagram that illustrates an exemplary system for dynamic scheduling and channel creation, in accordance with an exemplary embodiment of the disclosure. Referring to FIG. 1A, the system 100, comprises a media packaging and distribution system 102 that is communicatively coupled to published data sources 104a, . . . , 104n, advertiser order generation and advertisement decisioning systems (AOGADS) 106a, . . . , 106n, via a network 108 and/or other programmatic means. There is shown consumer devices 110a, . . . , 110n that are communicatively coupled to the network 108. The media content packaging and distribution system 102 may comprise a scheduler 112, a system for converting pre-encoded media content for live distribution, hereinafter referred to pre-encoded media content converter (PEMCC) 114, and a data storage system 116. There is also shown a source device 118 communicatively coupled to the scheduler 112 and the network 108. An external data source 120 is also provided, which is communicatively coupled to the data storage system 116, and the network 108.

The media content packaging and distribution system 102 may comprise suitable logic, circuitry, and interfaces that may be configured to execute code that handles distribution of content comprising audio, video, images, metadata, and/or other data (embedded and/or externally referenced). The media content packaging and distribution system 102 handles distribution, for example, multicasting, unicasting, broadcasting, streaming, for one or more channels to be viewed on one or more of the plurality of consumer devices 110a, . . . , 110n. The media content packaging and distribution system 102 may be operated by an entity related to handling or distribution of media content, for example, a broadcast provider or operator, or a network provider or operator. The entity related to handling or distribution of media content may also refer to a content owner, a distributor, a syndicator, a re-distributor, a content aggregator, a search, discovery, or cataloging service provider, or any other entity actively or passively involved with the distribution, cataloging, or referencing of complete or partial presentations of media content. The media content may include a video, an audio, a combination of audio and video presentations, a combination of audio, video, and/or embedded or externally referenced metadata, a combination of multiple-audio, multiple-video, and/or embedded or externally referenced metadata. The media content may also include metadata associated with the audio/video presentation, such as game scores, statistics, or timings, social media, cast/character/credits, geo-spatial data, and/or still-images or graphics (referenced or embedded). Throughout this document, the terms broadcast provider or broadcast operator, and network provider or network operator may be utilized to refer to the entity related to handling or distribution of media content, interchangeably. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs).

Each of the plurality of published data sources 104a, . . . , 104n may be coupled to one or more television networks and may comprise suitable logic, circuitry, and interfaces that may be configured to execute code that provides actual audiences for programs that were distributed. As illustrated in FIG. 1A, the plurality of published data sources 104a, . . . , 104n are coupled to the media content packaging and distribution system 102 via the network 108. The plurality of published data sources 104a, . . . , 104n may provide actual audiences for programs to the data storage system 116. An exemplary published data source may be Nielsen. Another exemplary published data source may be a published database that provides ratings for a media item, such as gross rating point (GRP). The GRP is an advertising or a promotion impact measure for each advertising and/or promotional campaigns, known in the art. Other exemplary published data sources may also include direct/indirect access to other public or private data sources (persistent or ephemeral) through programmatic means.

The AOGADS 106a, . . . , 106n may comprise suitable logic, circuitry, and interfaces that may be configured to place orders with the network provider that include information about type of spots to be distributed (e.g. multicast or broadcast), the number of spots to be distributed, and when should the spots be distributed. The media content packaging and distribution system 102 may be configured to electronically receive, via the network 108, deals comprising advertisers' orders from the plurality of AOGADS 106a, . . . , 106n. The AOGADS 106a, . . . , 106n may provide multiple orders, which need not be submitted at the same time. Therefore, orders with new or additional spots to be placed and any previously determined commercial break schedule may needs to be updated to accommodate the constraints and requirements of those spots already placed and of the new spots being received. In this regard, the AOGADS 106a, . . . , 106n may electronically book spots to a selling title (ST), and within the selling title there are constraints. The advertiser's order comprises airing constraints and placement requirements corresponding to the one or more spots, and each of the one or more commercial breaks comprises a plurality of inventory buckets. The airing constraints corresponding to each of the one or more spots comprise, for example, one or more of network constraints, selling title constraints, inventory utilization type constraints, allowable date and time constraints, and advertiser conflict constraints. In accordance with an embodiment, when the advertisements are inserted into a source stream, the advertisements are usually run (or pass) through the order generation component of the AOGADS 106a, . . . , 106n. The advertisement decisioning component of the AOGADS 106a, ..., 106n is used during a real-time content or advertisement placement activity, for example during dynamic ad insertion. For example, commercial or non-commercial advertisements may be dynamically inserted within program segments of a media feed based on the detected upcoming inbound trigger, signaling point, and/or signal in a source stream by the AOGADS 106a, ..., 106n. The AOGADS 106a, ..., 106n may utilize the programming schedule to identity the opportunities for the real-time content or advertisement placement activity. In accordance with an embodiment, the advertisement decisioning component of the AOGADS 106a, ..., 106n may be implemented in a client device, such as one or more of the plurality of consumer devices 110a, ..., 110n. In such a case, the advertisement decisioning component of the AOGADS 106a, ..., 106n may identify real-time content or advertisement placement opportunity for dynamic ad insertion. For example, commercial or non-commercial advertisements may be dynamically inserted within program segments of a media feed based on the detected upcoming inbound trigger, signaling point, and/or signal in a source stream by the AOGADS 106a, ..., 106n when implemented in the client device.

The network 108 may be any kind of network, or a combination of various networks, and it is shown illustrating the communication that may occur between the AOGADS 106a, ..., 106n and the media content packaging and distribution system 102. For example, the network 108 may comprise one or more of a cable television network, the Internet, a satellite communication network, a wide area network (WAN), a medium area network (MAN), and a local area network (LAN). Although a network 108 is shown, the disclosure is not limited in this regard, Accordingly, other exemplary modes may comprise uni-directional or bi-directional distribution, such as packet-radio, satellite. Furthermore, the network 108 is an exemplary embodiment of a distribution system.

The consumer devices 110a, ..., 110n may refer to end-user devices or consumption devices where the content is played to be consumed by a user. The number of impressions of a media item, such as an advertisement and/or promotional media, on such plurality of consumer devices 110a, ..., 110n determines the advertising impact or promotion impact and number of actual audiences achieved during campaigns. Examples of the consumer devices 110a, ..., 110n may include, but are not limited to connected TVs, connected TV with paired and/or connected devices (e.g., HDMI sticks, tablets), and second screen devices such as smartphones, tablets, game consoles, personal computers, set-top boxes, embedded devices, or any process/system capable of processing the output for any means, regardless of the capability or intent to decode for media presentation.

The scheduler 112 may comprise suitable logic, circuitry, and interfaces that may be configured to execute a code that handles a programming schedule of a channel. The programming schedule of a channel defines what media content should be scheduled, the ordering of the media content during playout, and when to distribute the content. The media content that is distributed may include both the programming content, such as long-form presentations, short-form presentations, news or sporting events; and non-programming content, such as paid advertisements, public service advertisements, or promotional material. In accordance with an embodiment, the programming schedule may comprise data structures or file formats capable of being processed by a computer, that comprise a reference mapping of different media content items that needs to be stitched by the PEMCC 114. The scheduler 112 may receive a programming schedule of an existing channel from the source device 118. The scheduler 112 may modify the received programming schedule to generate a new programming schedule, where the generation of the new programming schedule may be driven by real time or near-real time content context analysis, user-selection on a consumer device, such as the consumer devices 110a, ..., 110n, or driven by external data received from the external data source 120.

The PEMCC 114 may comprise suitable logic, circuitry, and interfaces that may be configured to execute a code to stitch one or more media items in accordance with the specified play schedule, such as the generated new programming schedule, to generate a specific program stream to be delivered to one or more of the plurality of consumer devices 110a, ..., 110n, based on the defined parameters. In accordance with an embodiment, the PEMCC 114 may be configured to stitch one or more pre-encoded media assets stored in the data storage system 116 with newly encoded live media sources to create a program stream for a new channel that is in a suitable state (or ready) to be distributed to one or more of the plurality of consumer devices 110a, ..., 110n without a requirement to re-encode the pre-encoded media assets before the distribution of the program stream of the new channel. In this regard, a stream could be tailored for a single device of the consumer devices 110a, ..., 110n, or for a plurality of the consumer devices 110a, ..., 110n. The decisioning as to which pre-encoded media assets to select for delivery over the network 108 to the one or more of the plurality of consumer devices 110a, ..., 110n may be based on the manipulation of the programming schedules that may be done in real time or near-real time. The manipulation of the programming schedules is driven by real time or near-real time content context analysis, user-selection on the consumer devices 110a, ..., 110n, or driven by external data received from the external data source 120. The PEMCC 114 may also be referred to as a stream manipulator that may be configured to insert live content or pre-stored media content, in an existing program stream based on manipulation of a programming schedule of an existing program stream, such as an existing channel. The insertion of live content, pre-stored media content, pre-encoded media assets, and/or the like may be driven by real time or near-real time content context analysis, user-selection on the consumer devices 110a, ..., 110n, or driven by external data received from the external data source 120. Alternatively, both the live or pre-stored programming content (such as long-form presentations, short-form presentations, news or sporting events); and non-programming content, such as paid advertisements, public service advertisements, or promotional material, may be dynamically scheduled, inserted, and stitched to create new channels based on real time or near-real time (or with a certain lag time) manipulation of the programming schedule.

The data storage system 116 may comprise suitable logic, circuitry, and interfaces that may be configured to store pre-encoded media content segments, such as VOD assets, live content segments, and metadata related to the pre-encoded media content segments and the live content segments. The data storage system 116 may also store, process, and generate aggregate viewing information based on various data feeds received from the external data source 120 and the published data sources 104a, ..., 104n.

The source device 118 may comprise suitable logic, circuitry, and interfaces that may be configured to communicate a media feed and a programming schedule of a channel, such as an existing channel, to the media content packaging and distribution system 102. In accordance with an embodiment, the media feed of the channel may corresponds to a broadcast feed. The source device 118 may be communicatively coupled to the network 108.

The external data source 120 may comprise suitable logic, circuitry, and interfaces that may be configured to execute code that handles retrieval and storage of audience data that corresponds to subscribers of the plurality of consumer devices 110a, . . . , 110n. The audience data may include demographics data, audience targeting data, trending data, device type data, device platform data, and content recognition-based data, such as automatic content recognition (ACR)-based data. The trending data comprises information of what's trending in the social networks (or platforms), such as Twitter, Facebook, and the like. The trending data also comprises information of what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

In operation, the media content packaging and distribution system 102 may be configured to handle distribution of one or more channels to be viewed on one or more of the plurality of consumer devices, such as the consumer devices 110a, . . . , 110n. The scheduler 112 may be configured to receive a media feed and a first programming schedule of a first channel of the one or more channels from the source device 118. An application server (described in FIG. 1B) may be configured to receive a user-preference from a first consumer device of the plurality of consumer devices 110a, . . . , 110n on which the first channel is viewed. The scheduler 112 may be configured to analyze, based on content context analysis, one or more other live feeds of other channels of the one or more channels or pre-encoded media assets stored in the data storage system 116. The scheduler 112 may be further configured to recommend, based on the content context analysis, a media item to be inserted in the media feed of the first channel, based on the received user-preference. The scheduler 112 may be configured to dynamically schedule the recommended media item in the media feed of the first channel to be delivered over a distribution system, for example, the network 108, to be viewed on the first consumer device of the plurality of consumer devices 110a, . . . , 110n. The scheduler 112 may be configured to dynamically schedule the recommended media item based on the content context analysis executed in real time or near-real time. The scheduler 112 may modify the first programming schedule to generate a second programming schedule to deliver the recommended media item over the network 108. The PEMCC 114 may be configured to stitch one or more media items that corresponds to the recommended media item in one or more spots of the received media feed to generate a program stream for distribution to the first consumer device or other consumer devices of the plurality of consumer devices 110a, . . . , 110n.

In accordance with an exemplary aspect of the disclosure, the media content packaging and distribution system 102 may be configured to handle distribution of one or more channels to be viewed on one or more of a plurality of consumer devices, such as the consumer devices 110a, . . . , 110n. The scheduler 112 may be configured to receive a media feed and a first programming schedule of a first channel of the one or more channels from the source device 118. The scheduler 112 may be configured to select one or more pre-encoded media assets to be inserted in the media feed of the first channel based on one or more defined selection parameters. The one or more defined selection parameters may correspond to user-preferences received from the one or more of the plurality of consumer devices 110a, . . . , 110n on which the first channel is viewed. The one or more defined selection parameters may further correspond to a received input that corresponds to user-selections on the one or more of the plurality of consumer devices 110a, . . . , 110n and/or audience-based parameters received from the external data source 120 over the network 108. The scheduler 112 may be further configured to dynamically create a plurality of new channels based on insertion of the selected one or more pre-encoded media assets in different channels of the plurality of new channels and based on the one or more defined selection parameters. The scheduler 112 may modify the first programming schedule based on the insertion of the selected one or more pre-encoded media assets in different channels to generate a plurality of programming schedules for the plurality of new channels.

Figure 1B:
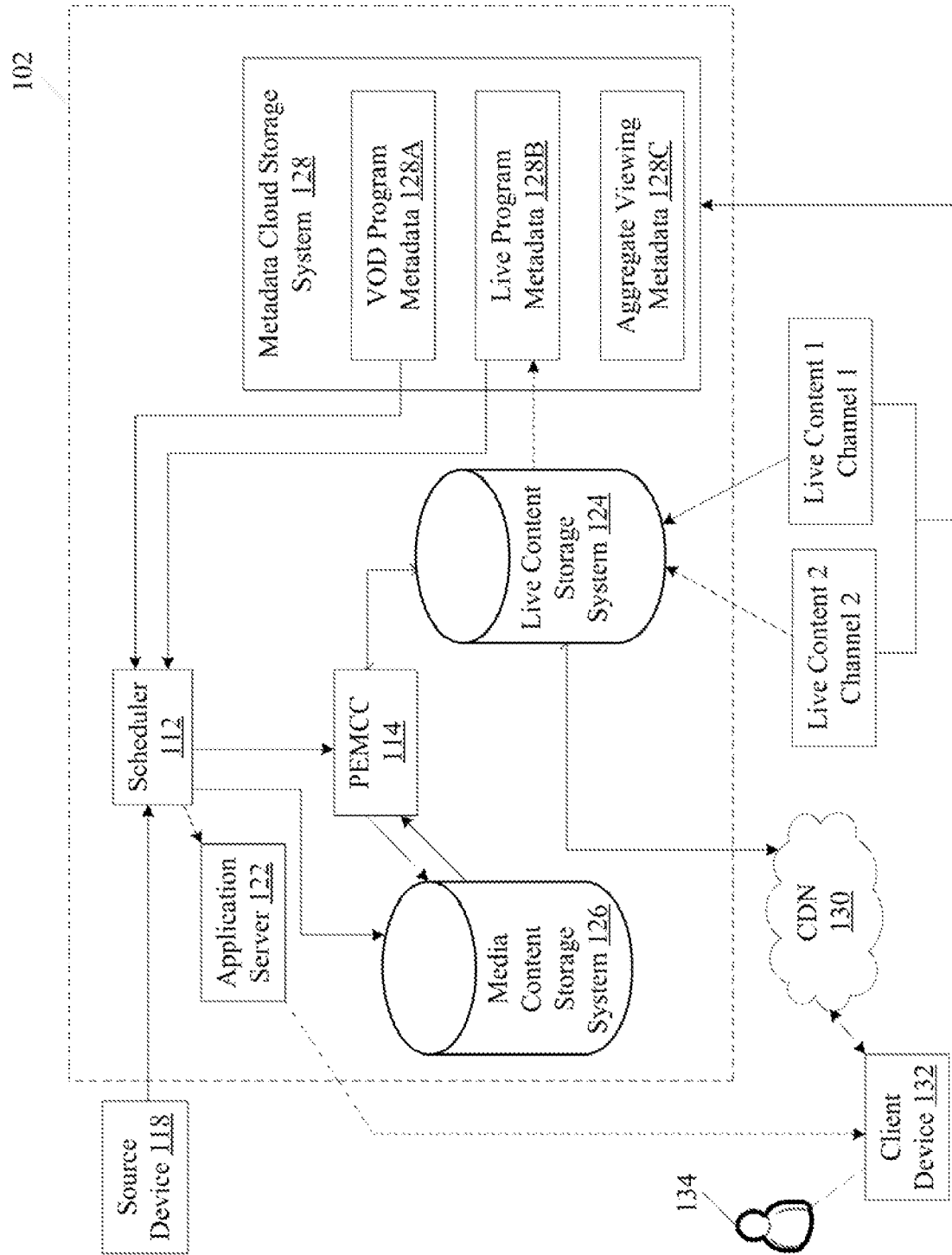
FIG. 1B is a block diagram that illustrates an exemplary media content packaging and distribution system for dynamic scheduling and channel creation, in accordance with an exemplary embodiment of the disclosure.

FIG. 1B is a block diagram that illustrates an exemplary media content packaging and distribution system for dynamic scheduling and channel creation, in accordance with an exemplary embodiment of the disclosure. Referring to FIG. 1B, the media content packaging and distribution system 102 may further comprise an application server 122, a live content storage system 124, a media content storage system 126, and a metadata cloud storage system 128. The metadata cloud storage system 128 may include VOD program metadata 128A, live program metadata 128B, and aggregate viewing information 128C. The live content storage system 124, the media content storage system 126, and the metadata cloud storage system 128 may be provided in the data storage system 116, as described in FIG. 1A. There is shown the scheduler 112, the PEMCC 114, and the source device 118 provided in the media content packaging and distribution system 102, as described in FIG. 1A. There is also shown a CDN 130, which is an example of the network 108, a client device 132, which is one of the plurality of consumer devices 110a, . . . , 110n, and a user 134 associated with the client device 132.

In some embodiments of the disclosure, the scheduler 112, the PEMCC 114, and the application server 122 may be integrated to form an integrated system. In some embodiments of the disclosure, as shown, the scheduler 112, the PEMCC 114, and the application server 122 may be distinct. Other separation and/or combination of the various entities of the exemplary media content packaging and distribution system 102 illustrated in FIG. 1B may be done without departing from the spirit and scope of the various embodiments of the disclosure.

The application server 122 may comprise suitable logic, circuitry, and interfaces that may be configured to communicate a notification of a recommended media item to a consumer device, for example, the client device 132. The notification may be communicated to seek a confirmation from a user, such as the user 134 associated with the client device 132 to display the recommended media item on the client device 132. The application server 122 may further receive an input that corresponds to the confirmation from the user 134 associated with the client device 132 to display the recommended media item on the client device 132, and further communicate the received input to the scheduler 112.

The application server 122 may be further configured to receive user-preferences from the plurality of consumer devices 110a, ..., 110n. In accordance with an embodiment, the application server 122 may be configured to receive an input that corresponds to user-selections on the plurality of consumer devices 110a, ..., 110n, such as the client device 132, over the network 108. The application server 122 acts as an interface between the scheduler 112 of the media content packaging and distribution system 102 and the plurality of consumer devices 110a, ..., 110n, such as the client device 132.

The live content storage system 124 may comprise suitable logic, circuitry, and interfaces that may be configured to store live content segments of one or more live feeds of channels, such as a live broadcast feed of a CNN channel. The live content storage system 124 may be communicatively coupled to the CDN 130 to receive the one or more live feeds of channels. The media content storage system 126 may comprise suitable logic, circuitry, and interfaces that may be configured to store media content segments such as VOD content segments. The media content storage system 126 may be communicatively coupled to the CDN 130. The media content storage system 126 may include pre-encoded media assets.

The metadata cloud storage system 128 may comprise suitable logic, circuitry, and interfaces that may be configured to store VOD program metadata 128A, live program metadata 128B, and aggregate viewing information 128C. The VOD program metadata 128A may include metadata associated with media content segments stored in the media content storage system 126. Examples of the VOD program metadata 128A may include a media item identifier, a title of the media item, a short summary of the media content segments, a short summary of ideal ad placements within the content, a file format, digital right management (DRM), encryption information, length of the media item, a date and/or time the media item was added to the catalog of media items, a new item indicator for the media item (e.g., a new media asset that became available within the last 24 hours, last few days, last week, and/or the like), a media item class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies. In accordance with an exemplary embodiment, the VOD program metadata 128A may also store program-specific information (PSI) data as defined by ISO/IEC 13818-1 (MPEG-2), closed captioning data, and subtitles associated with the media content segments stored in the media content storage system 126. Other forms of metadata may be utilized without departing from the spirit and scope of the various embodiments of the disclosure.

The aggregate viewing information 128C may include audience-based parameters. The audience-based parameters may include calculated values derived by processing of audience data, which corresponds to subscribers of the plurality of consumer devices 110a, ..., 110n, received from the external data source 120. The audience-based parameters may also include a path to retrieve a media item, for example, a trending media item, from the external data source 120 or other content servers.

The live program metadata 128B may include metadata associated with live content segments of one or more live feeds of channels stored in the live content storage system 124. Examples of the live program metadata 128B may include a media item identifier, a title of the media item, a short summary of the content segments, a file format, encryption information, length of the media item, a date and/or time the media item was added to the catalog of media items, a new item indicator for the media item, a media item class, for example, a television show, a cartoon program, a movie, a news media, an episode, a game, a clip, a recorded sports event, interactive media, and/or the like. In accordance with an exemplary embodiment, the live program metadata 128B may also store program-specific information (PSI) data as defined by ISO/IEC13818-1 (MPEG-2), closed captioning data, subtitles, and one or more inbound triggers, signals, or markers, of the live media feed associated with the live content segments stored in the live content storage system 124. Other forms of metadata may be utilized without departing from the spirit and scope of the various embodiments of the disclosure.

The CDN 130 may correspond to the network 108. The CDN 130 may comprise networks configured for distributing media content. Generally, the term "content," "metadata," "media," and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. The CDN 130 may be configured for providing the plurality of consumer devices 110a, ..., 110n, such as the client device 132, with media content via transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The client device 132 may be one of the plurality of consumer devices 110a, ..., 110n. In accordance with an embodiment, the client device 132 may be an ACR-enabled device. The client device 132 may be configured to communicate with the application server 122, via the CDN 130, or a separate communication network.

Figure 2:
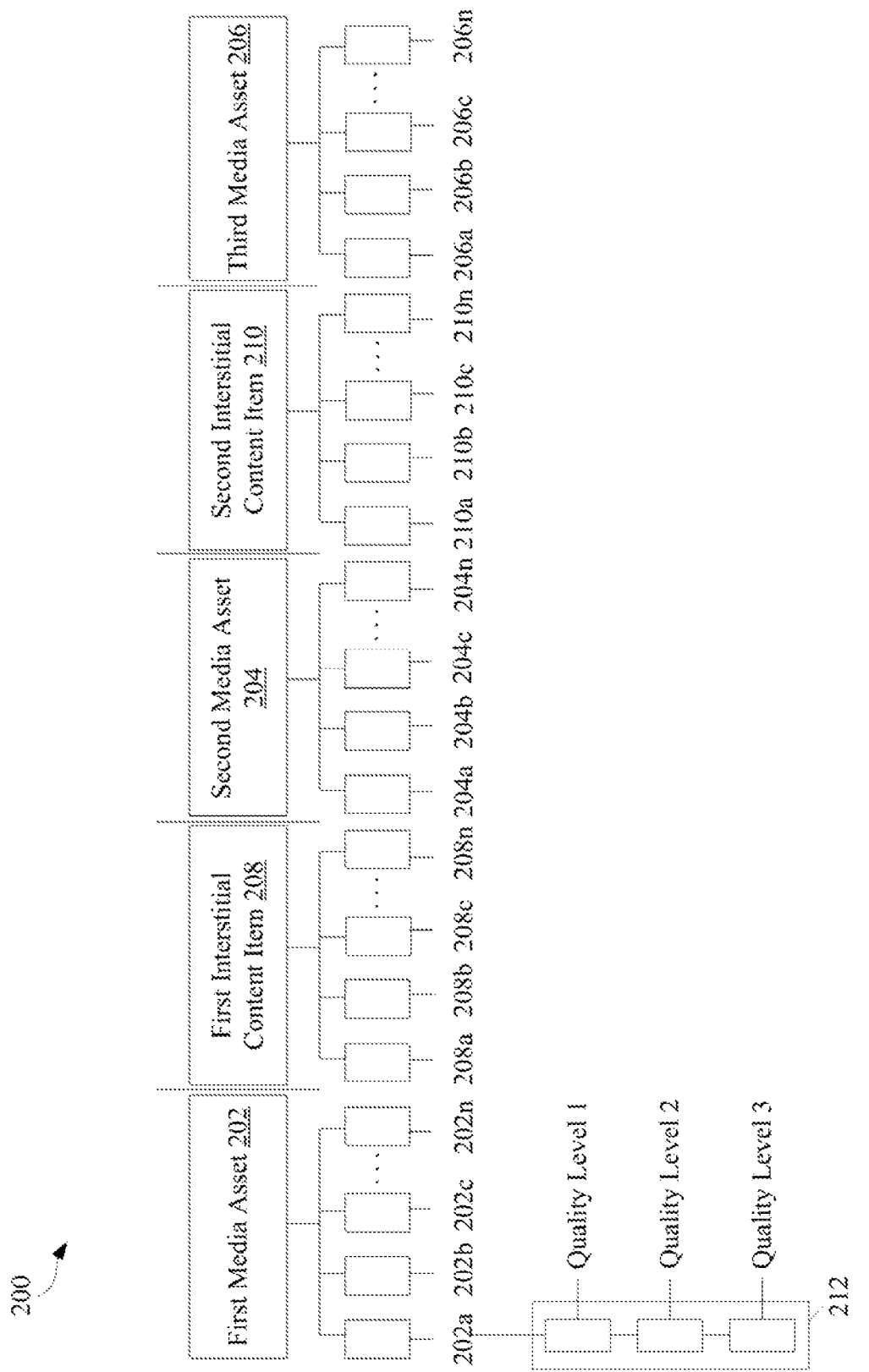
FIG. 2 illustrates segmenting of pre-encoded media content to depict a framework for dynamic scheduling and channel creation by the media content packaging and distribution system of FIG. 1B, in accordance with an exemplary embodiment of the disclosure.

FIG. 2 illustrates an arrangement of pre-encoded media assets in accordance with a programming schedule to depict a framework for dynamic scheduling and channel creation by the media content packaging and distribution system of FIG. 1B, in accordance with an exemplary embodiment of the disclosure. Referring to the exemplary arrangement of FIG. 2, there is shown a first media asset 202, a second media asset 204, a third media asset 206. There is also shown a first interstitial content item 208 placed after the first media asset 202, and a second interstitial content item 210 placed after the second media asset 204. Each media assets 202, 204, and 206 may be a pre-encoded content item, and may be stored in the media content storage system 126 in segments or other forms. For example, the first media asset 202 may be segmented into first set of video segments 202a, 202b, 202c, ..., 202n. Similarly, the second media asset 204 and the third media asset 206 may also be segmented into second set of video segments 204a, 204b, 204c, ..., 204n, and third set of video segments 206a, 206b, 206c, ..., 206n respectively. By way of example, the segmentation may be executed by a segmenting system (not shown) during a preparation stage of the media assets. In accordance with an embodiment, all the segments of the first set of video segments 202a, 202b, 202c, ..., 202n, the second set of video segments 204a, 204b, 204c, ..., 204n, and third set of video segments 206a, 206b, 206c, ..., 206n, may be segmented into consistent length, for example, 10 seconds segments. It may be advantageous to have a consistent and smaller file size of segments to be able to quickly push to the CDN 130, and also for quick downloading by a media player at the end-user side, such as on the plurality of consumer devices 110a, . . . , 110n. During the preparation stage of the media assets, an optimum size (or length) of segments may be determined by the segmentation system. Smaller chunks or segments of VOD assets may be difficult to manage as metadata associated with them may increase, whereas larger chunks or segments may be difficult to communicate by the media content packaging and distribution system 102 and also to be downloaded by the media player so as to maintain an adequate buffer for consistent streaming and playback at the media player. Thus, an optimal size of segments may be determined. It is to be understood by those skilled in the art that various changes may be made and segments of different file sizes (or length) may be used without departure from the scope of the present disclosure. Further, it should be recognized by one skilled in the art that other streaming protocols may require a different processing of media content. Thus, the scope of the disclosure should not be limited to the processing or preparation of media content to allow delivery using different delivery methods, streaming protocols, or distribution system, known in the art. Further, instead of the media assets arranged, as shown, live content segments may be arranged after, in between, or prior to a media asset (e.g. VOD content segments) or an interstitial content item. The insertion of the live content segments may be done on-the-fly based on dynamic scheduling and programming schedule manipulation. The insertion of live content, pre-stored media content, pre-encoded media assets, and/or the like, may be driven by real time or near-real time content context analysis, user-selection on the consumer devices 110a, . . . , 110n, or driven by external data received from the external data source 120. The scheduler 112 in association with the PEMCC 114 (also referred to as a stream manipulator) may be configured to insert live content or pre-stored media content, in an existing program stream based on manipulation of a programming schedule of an existing program stream, such as an existing channel.

In accordance with an embodiment, each segment of the first set of video segments 202a, 202b, 202c, . . . , 202n, the second set of video segments 204a, 204b, 204c, . . . , 204n, and third set of video segments 206a, 206b, 206c, . . . , 206n, may be further processed to be stored at various quality levels, and content encryption modes for the purposes of adaptive bitrate streaming and Digital Rights Management, for example, the video segment 202a may be stored in a plurality of quality levels, for example, high definition (HD), high dynamic range (HDR) video, or different quality levels in accordance with specified pixel resolutions, bitrates, frame rates, and/or sample frequencies. As each of the media assets, such as the media assets 202 to 206, are pre-encoded, segmented, and stored in the plurality of quality levels in the media content storage system 126, the media assets may be re-used to create new channels, such as new program streams, without requiring to re-encode a selected media asset when a new program stream is created using the pre-encoded media assets.

For the sake of brevity, and with reference to FIG. 2, there is shown an example of media packaging for adaptive streaming using certain protocols or streaming methods for at least one delivery method of the distribution system. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed one or more of the plurality of consumer devices 110a, . . . , 110n, based on at least the desired delivery method, delivery conditions, content protection requirements, to satisfy operational and technical requirements, as needed. The operational and technical requirements may include, but are not limited to, media encoding, media segmentation, programming schedule (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for a same media asset may not be required. Further, based on different operational and technical requirements, media packaging or the arrangement of media assets or other content in a program stream may be different. The media content that is prepared and distributed may include both the programming content, such as long-form presentations, short-form presentations, news or sporting events; and non-programming content, such as paid advertisements, public service advertisements, or promotional material.

Currently, dedicated encoders, such as physical encoders, are used to encode each program stream before distribution or transmission (i.e. before a distribution of a program stream of a channel). Such dedicated encoders are not only costly but also limit ability of a broadcast provider to swap or change content dynamically in a program stream as each content item needs to pass through such dedicated encoders for transmission. In other words, if any new content item is to be inserted in the program stream of channel that is to be distributed, that program stream then needs to be re-encoded again. This in turn increases re-work and requires installation of large infrastructures and resources to maintain uninterrupted content delivery for existing channel and limits the ability of the broadcast or network provider to change content in real time or near-real time. In accordance with the various embodiments of the present disclosure, the media content packaging and distribution system 102 provides an ability to dynamically schedule a media item, such as a pre-encoded media asset, and insert the media item in an existing live media feed of a channel to be directly delivered over a distribution system (such as one or more delivery methods) to be viewed on one or more consumer devices 110a, . . . , 110n. The program stream in which the new media item is inserted may not be required to pass through the dedicated encoders before delivery over the network 108, such as the CDN 130.

Figure 3:
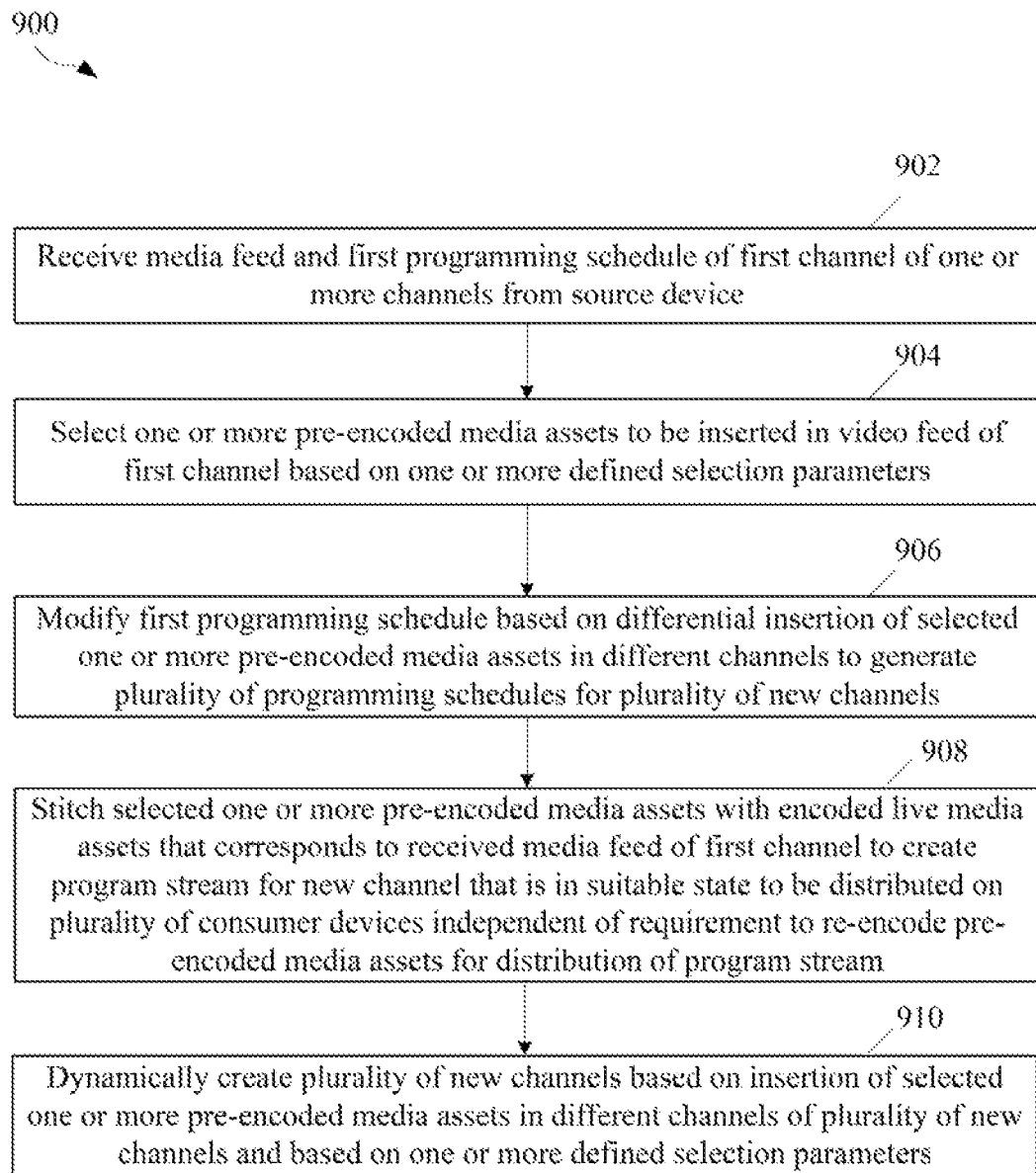
FIG. 3 depict a flow chart illustrating exemplary operations for creation of a plurality of new channels using pre-encoded media assets in the television content packaging and distribution system of FIG. 1B, in accordance with an exemplary embodiment of the disclosure.

FIG. 3 depict a flow chart illustrating exemplary operations for creation of a plurality of new channels using pre-encoded media assets in the television content packaging and distribution system of FIG. 1B, in accordance with an exemplary embodiment of the disclosure. Referring to FIG. 3, there is shown a flow chart 900 comprising exemplary operations 902 through 910.

At 902, a media feed (or an identifier of the media feed) and a first programming schedule of a first channel of the one or more channels may be received from the source device 118. The scheduler 112 may receive the media feed and the first programming schedule of the first channel, such as an existing channel.

At 904, one or more pre-encoded media assets may be selected for subsequent insertion in the media feed of the first channel based on one or more defined selection parameters. The one or more pre-encoded media assets may be pre-stored in the media content storage system 126. The one or more defined selection parameters correspond to user-preferences received from one or more of the plurality of consumer devices 110$a$, ..., 110$n$ on which the first channel is viewed. The one or more defined selection parameters further corresponds to a received input that corresponds to user-selections on the plurality of consumer devices 110$a$, ..., 110$n$. The one or more defined selection parameters also correspond to audience-based parameters received from the external data source 120 over the network 108.

At 906, the first programming schedule may be modified based on differential insertion of the selected one or more pre-encoded media assets in different channels to generate a plurality of programming schedules for a plurality of new channels. The scheduler 112 may be configured to modify the first programming schedule based on the selection of the one or more pre-encoded media assets. For example, one or more references that points to the selected one or more pre-encoded media assets may be included in the first programming schedule for scheduling. Thus, the scheduler 112 may be configured to generate a plurality of programming schedules for the plurality of new channels.

At 908, the selected one or more pre-encoded media assets may be stitched with encoded live media assets that corresponds to the received media feed of the first channel. The PEMCC 114 may be configured to stitch the selected one or more pre-encoded media assets with the received media feed of the first channel to create a program stream for a new channel that is in a suitable state to be distributed to the plurality of consumer devices. The distribution (e.g. broadcast, multicast, streaming) by the media content packaging and distribution system 102 may be executed independent of a requirement to re-encode the pre-encoded media assets for the distribution of the program stream of the new channel.

At 910, a plurality of new channels may be dynamically created based on insertion of the selected one or more pre-encoded media assets in different channels of the plurality of new channels and based on the one or more defined selection parameters. As each of the media assets, such as the media assets 202 to 206 (FIG. 2), are pre-encoded, segmented, and stored in the media content storage system 126, the media assets may be re-used to create new channels, such as new program streams, without requiring to re-encode a selected media asset when a new program stream is created using the pre-encoded media assets.

Figure 4:
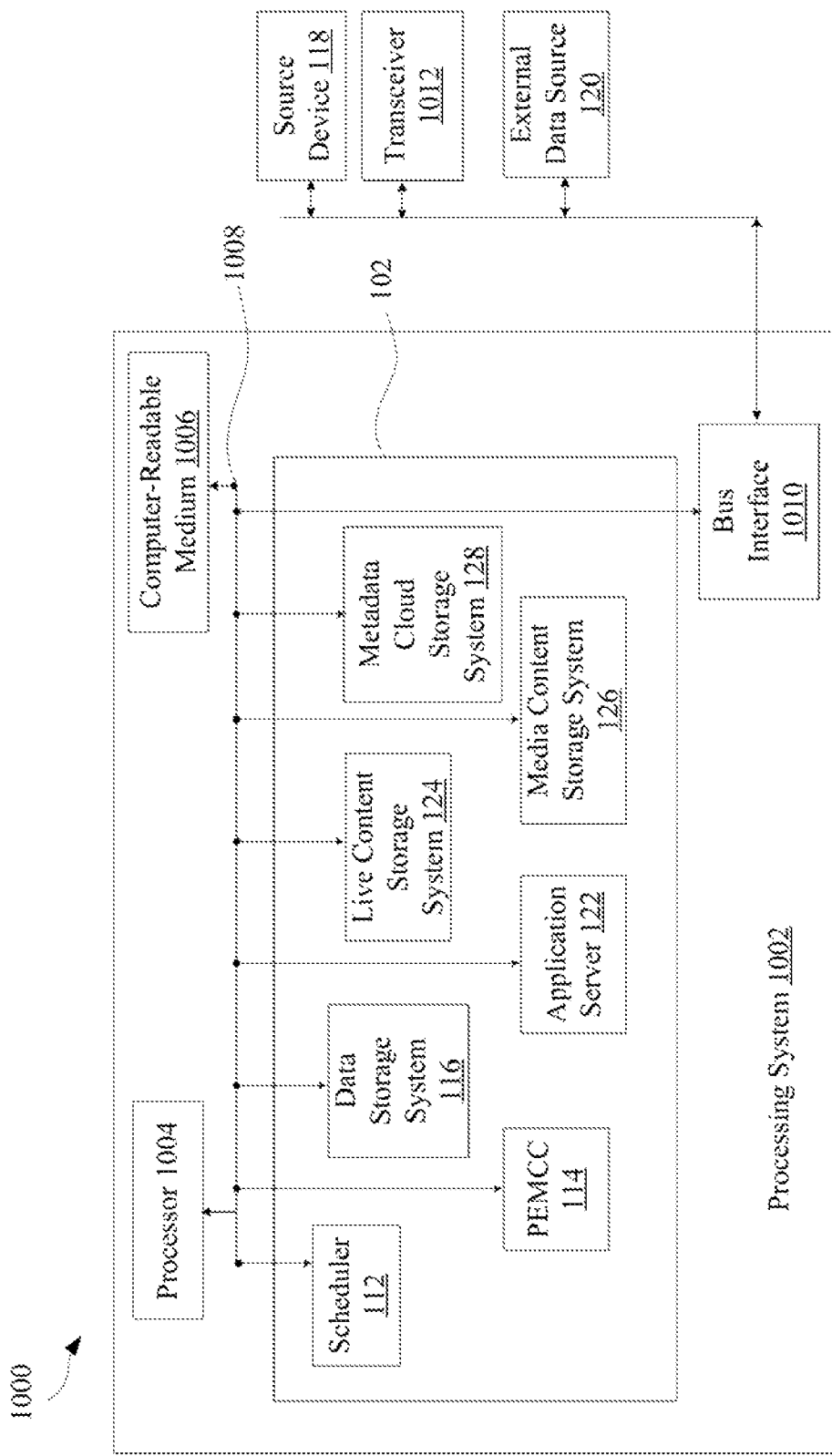
FIG. 4 is a conceptual diagram illustrating an example of a hardware implementation for a content packaging and distribution system employing a processing system for channel creation using pre-encoded media assets, in accordance with an exemplary embodiment of the disclosure.

FIG. 4 is a conceptual diagram illustrating an example of a hardware implementation for a content packaging and distribution system employing a processing system for creation of channels using pre-encoded media assets, in accordance with an exemplary embodiment of the disclosure. Referring to FIG. 4, the hardware implementation shown by a representation 1000 for the media content packaging and distribution system 102 employs a processing system 1002 for creation of channels using pre-encoded media assets, in accordance with an exemplary embodiment of the disclosure, as described herein. In some examples, the processing system 1002 may comprise one or more hardware processors 1004, a non-transitory computer-readable medium 1006, the scheduler 112, a hardware PEMCC 114, the data storage system 116, the application server 122, a hardware live content storage system 124, a hardware media content storage system 126, and a hardware metadata cloud storage system 128. In accordance with an embodiment, the data storage system 116 may include the hardware live content storage system 124, the hardware media content storage system 126, and the hardware metadata cloud storage system 128. It should be recognized that, in some embodiment of the disclosure, one or more components of FIG. 4 may include software whose corresponding code may be executed by a at least one processor, for across multiple processing environments. For example, the scheduler 112, the data storage system 116, the application server 122 may include software that may be executed across a single or multiple processing environments.

In this example, the media content packaging and distribution system 102 employing the processing system 1002 may be implemented with bus architecture, represented generally by bus 1008. The bus 1008 may include any number of interconnecting buses and bridges depending on the specific implementation of the media content packaging and distribution system 102 and the overall design constraints. The bus 1008 links together various circuits including the one or more processors, represented generally by the processor 1004, the non-transitory computer-readable media, represented generally by the computer-readable medium 1006, the scheduler 112, the hardware PEMCC 114, the data storage system 116, the application server 122, the hardware live content storage system 124, the hardware media content storage system 126, and the hardware metadata cloud storage system 128 which may be configured to carry out one or more operations or methods described herein. A bus interface 1010 provides an interface between the bus 1008 and a transceiver 1012. The transceiver 1012 provides communicating via the network 108 with various other apparatus, such as the AOGADS 106$a$, ..., 106$n$, the consumer devices 110$a$, ..., 110$n$, such as the client device 132 or the first consumer device 402$a$, the external data source 120, and the source device 118.

The processor 1004 may be configured to manage the bus 1008 and general processing, including the execution of a set of instructions stored on the computer-readable medium 1006. The set of instructions, when executed by the processor 1004, causes the media content packaging and distribution system 102 to execute the various functions described herein for any particular apparatus. The computer-readable medium 1006 may also be used for storing data that is manipulated by the processor 1004 when executing the set of instructions. The computer-readable medium 1006 may also be configured to store data for one or more of the scheduler 112, the hardware PEMCC 114, the data storage system 116, the application server 122, the hardware live content storage system 124, the hardware media content storage system 126, and/or the hardware metadata cloud storage system 128.

In an aspect of the disclosure, the processor 1004, the computer-readable medium 1006, or a combination of both may be configured or otherwise specially programmed to execute the operations or functionality of the scheduler 112, the hardware PEMCC 114, the data storage system 116, the application server 122, the hardware live content storage system 124, the hardware media content storage system 126, and/or the hardware metadata cloud storage system 128, or various other components described herein. For example, processor 1004, computer-readable medium 1006, or a combination of both may be configured or otherwise specially programmed to perform the operations and functionality of the scheduler 112, the hardware PEMCC 114, the data storage system 116, the application server 122, the hardware live content storage system 124, the hardware media content storage system 126, and/or the hardware metadata cloud storage system 128 as described with respect to FIGS. 1A, 1B, 2, 3, and 4.

Various embodiments of the disclosure comprise a media content packaging and distribution system 102 that may be configured to handle distribution of one or more channels to be viewed on one or more of a plurality of consumer devices (such as the consumer devices 110a, . . . , 110n). The media content packaging and distribution system 102 may comprise, for example, the scheduler 112, the PEMCC 114, and the data storage system 116. The media content packaging and distribution system 102 may further comprise, for example, the application server 122, the live content storage system 124, the media content storage system 126, the metadata cloud storage system 128. The metadata cloud storage system 128 may further include the VOD program metadata 128A, the live program metadata 128B, and the aggregate viewing information 128C. The scheduler 112 may be configured to receive a media feed and a first programming schedule of a first channel of the one or more channels from the source device 118. The scheduler 112 may be configured to select one or more pre-encoded media assets to be inserted in the media feed of the first channel based on one or more defined selection parameters. The scheduler 112 may be configured to dynamically create a plurality of new channels based on insertion of the selected one or more pre-encoded media assets in different channels of the plurality of new channels and based on the one or more defined selection parameters.

Various embodiments of the disclosure may provide a non-transitory computer-readable medium having stored thereon, computer implemented instruction that when executed by a processor causes a media content packaging and distribution system to execute operations to handle distribution of one or more channels to be viewed on one or more of a plurality of consumer devices (such as the consumer devices 110a, . . . , 110n). The media content packaging and distribution system 102 may execute operations comprising receiving a media feed and a first programming schedule of a first channel of the one or more channels from the source device 118. One or more pre-encoded media assets to be inserted in the media feed of the first channel may be selected based on one or more defined selection parameters. A plurality of new channels may be dynamically created based on insertion of the selected one or more pre-encoded media assets in different channels of the plurality of new channels and based on the one or more defined selection parameters.

The scheduler 112 and the PEMCC 114 in association with the data storage system 116 provides significant productivity and efficiency improvements since the process of creating new program streams for hundreds of new channels has been simplified and a real time or near-real time (dynamic) scheduling of new media items is made possible. The scheduler 112 and the PEMCC 114 in association with the data storage system 116 or the external data source 120 provides an ability to the media content packaging and distribution system 102 to dynamically schedule a media item, such as a pre-encoded media asset, and insert the media item in an existing live media feed of a channel to be directly delivered over the network 108 to be viewed on one or more consumer devices 110a, . . . , 110n. The program stream in which the new media item is inserted may not be required to pass through the dedicated and costly physical encoders before delivery over the network 108, such as the CDN 130. Thus, the scheduler 112 enables the media content packaging and distribution system 102 to operate more efficiently and optimally providing both an economic and a cost advantage. A plurality of new channels may be created utilizing less memory than would otherwise be required resulting in much faster processing time (faster computation time without sacrificing accuracy). This enables a faster or real time change of programming schedule and scheduling of selected media items based on different section parameters. The ability to quickly generate new channels may free up valuable processing resources such as memory and computing power. The scheduler 112 and the PEMCC 114 in association with the data storage system 116 provides the network provider with an ability to not only provide new channel offerings in cost-effective manner but also provide enhanced viewer experience to increase their appeal in order to gain wider audience.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for creation of channels based pre-encoded media assets.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual sever or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   a memory for storing instructions; and
   a processor to execute the instructions, and based on the executed instructions, the processor is further configured to:
   select a pre-encoded media asset based on manipulation of a first programming schedule;
   insert the pre-encoded media asset in a media feed of a first channel based on an input on a notification associated with a media item and a defined selection parameter; and
   create a plurality of new channels based on the pre-encoded media assets inserted in different channels and the defined selection parameter,
   wherein the plurality of new channels is created based on a re-use of the pre-encoded media asset for one of the plurality of new channels such that the plurality of new channels is created independent of an encoding operation prior to a distribution of program streams of the plurality of new channels to a plurality of consumer devices such that the plurality of new channels are delivered over a distribution network without being required to be re-encoded.

2. The system according to claim 1, wherein the defined selection parameter comprises an audience-based parameter that indicates an aggregate interest level of a plurality of users for the media item,
   wherein the audience-based parameter is received from an external data source, and
   wherein the pre-encoded media asset is associated with a specified quality level and a specified content encryption mode.

3. The system according to claim 2, wherein the defined selection parameter further comprises a user preference received from the plurality of consumer devices on which the first channel is viewed.

4. The system according to claim 2, wherein the defined selection parameter further comprises a received user input, and
   wherein the received user input corresponds to a user-selection on the plurality of consumer devices.

5. The system according to claim 1, wherein the processor is further configured to receive the media feed and the first programming schedule of the first channel from a source device,
   wherein the first programming schedule includes a reference that points to the pre-encoded media asset.

6. The system according to claim 1, wherein the processor is further configured to store a plurality of video segments of the pre-encoded media asset,
   wherein the plurality of video segments is stored at a plurality of quality levels and a plurality of content encryption modes corresponding to a plurality of delivery methods for adaptive bitrate streaming of the plurality of video segments.

7. The system according to claim 6, wherein the plurality of quality levels corresponds to different pixel resolutions, different frame rates, or different sample frequencies.

8. The system according to claim 1, wherein the processor is further configured to recommend the media item for the insertion in the media feed with respect to a received user preference,
   wherein the media item is recommended based on content context analysis.

9. The system according to claim 1, wherein the processor is further configured to:
   modify the first programming schedule based on the insertion of the pre-encoded media asset in the different channels of the first channel; and
   generate a plurality of programming schedules for the plurality of new channels based on the modification of the first programming schedule.

10. The system according to claim 1, wherein the processor is further configured to:
    stitch the pre-encoded media asset with an encoded live media asset,
        wherein the encoded live media asset corresponds to the media feed of the first channel;
    create a program stream for a new channel based on the pre-encoded media asset stitched with the encoded live media asset; and
    distribute the program stream to the plurality of consumer devices,
        the program stream is in a state for the distribution to the plurality of consumer devices.

11. A method, comprising:
    selecting, at a processor, a pre-encoded media asset based on manipulation of a first programming schedule;
    inserting, at the processor, the pre-encoded media asset in a media feed of a first channel based on an input on a notification associated with a media item and a defined selection parameter; and
    creating, at the processor, a plurality of new channels based on the pre-encoded media assets inserted in different channels and the defined selection parameter,
        wherein the plurality of new channels is created based on a re-use of the pre-encoded media asset for one of the plurality of new channels such that the plurality of new channels is created independent of an encoding operation prior to a distribution of program streams of the plurality of new channels to a plurality of consumer devices such that the plurality of new channels are delivered over a distribution network without being required to be re-encoded.

12. The method according to claim 11, wherein the defined selection parameter comprises an audience-based parameter that indicates an aggregate interest level of a plurality of users for the media item,
    wherein the audience-based parameter is received from an external data source, and
    wherein the pre-encoded media asset is associated with a specified quality level and a specified content encryption mode.

13. The method according to claim 12, wherein the defined selection parameter further comprises a user preference received from the plurality of consumer devices on which the first channel is viewed.

14. The method according to claim 12, wherein the defined selection parameter further comprises a received user input, and
    wherein the received user input corresponds to a user-selection on the plurality of consumer devices.

15. The method according to claim 11, further comprising:
    receiving, at the processor, the media feed and the first programming schedule of the first channel from a source device,
        wherein the first programming schedule includes a reference that points to the pre-encoded media asset; and
    storing, at the processor, a plurality of video segments of the pre-encoded media asset,
        wherein the plurality of video segments is stored at a plurality of quality levels and a plurality of content encryption modes corresponding to a plurality of delivery methods for adaptive bitrate streaming of the plurality of video segments.

16. The method according to claim 15, wherein the plurality of quality levels corresponds to different pixel resolutions, different frame rates, or different sample frequencies.

17. The method according to claim 11, further comprising recommending, at the processor, the media item for the insertion in the media feed with respect to a received user preference,
    wherein the media item is recommended based on content context analysis.

18. The method according to claim 11, further comprising:
    modifying, at the processor, the first programming schedule based on the insertion of the pre-encoded media asset in the different channels; and
    generating, at the processor, a plurality of programming schedules for the plurality of new channels based on the modification of the first programming schedule.

19. The method according to claim 11, further comprising:
    stitching, at the processor, the pre-encoded media asset with an encoded live media asset,
        wherein the encoded live media asset corresponds to the media feed of the first channel;
    creating, at the processor, a program stream for a new channel based on the pre-encoded media asset stitched with the encoded live media asset; and
    distributing, at the processor, the program stream to the plurality of consumer devices,
        wherein the program stream is in a state for the distribution to the plurality of consumer devices.

20. A non-transitory computer readable medium, having stored thereon, computer executable code, which when executed by a processor, cause the processor to execute operations, the operations comprising:
    selecting a pre-encoded media asset of a specified quality level and a specified content encryption mode based on manipulation of a first programming schedule;
    inserting the pre-encoded media asset in a media feed of a first channel based on an input on a notification associated with a media item and a defined selection parameter; and
    creating a plurality of new channels based on the pre-encoded media assets inserted in different channels and the defined selection parameter,
        wherein the plurality of new channels is created based on a re-use of the pre-encoded media asset for one of the plurality of new channels such that the plurality of new channels is created independent of an encoding operation prior to a distribution of program streams of the plurality of new channels to a plurality of consumer devices such that the plurality of new channels are delivered over a distribution network without being required to be re-encoded.

* * * * *